United States Patent
Fujino

(10) Patent No.: US 12,164,191 B2
(45) Date of Patent: Dec. 10, 2024

(54) OPTICAL LAMINATE, METHOD FOR DETERMINING AUTHENTICITY THEREOF, AND ARTICLE

(71) Applicant: ZEON CORPORATION, Tokyo (JP)

(72) Inventor: Yasuhide Fujino, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 18/263,134

(22) PCT Filed: Jan. 26, 2022

(86) PCT No.: PCT/JP2022/002846
§ 371 (c)(1),
(2) Date: Jul. 27, 2023

(87) PCT Pub. No.: WO2022/168699
PCT Pub. Date: Aug. 11, 2022

(65) Prior Publication Data
US 2024/0231144 A1    Jul. 11, 2024

(30) Foreign Application Priority Data
Feb. 5, 2021   (JP) .................. 2021-017649

(51) Int. Cl.
*G02F 1/1335*   (2006.01)
(52) U.S. Cl.
CPC .. *G02F 1/133543* (2021.01); *G02F 1/133536* (2013.01); *G02F 1/133548* (2021.01)
(58) Field of Classification Search
CPC ......... G02F 1/133543; G02F 1/133536; G02F 1/133548
See application file for complete search history.

(56) References Cited

U.S. PATENT DOCUMENTS

| | | | |
|---|---|---|---|
| 10,690,827 | B2 | 6/2020 | Inada et al. |
| 2018/0164480 | A1* | 6/2018 | Yoshida ............... G02F 1/1396 |
| 2019/0250458 | A1* | 8/2019 | Robinson ........... G02F 1/13363 |
| 2020/0264357 | A1* | 8/2020 | Yoshinari ............... H10K 50/86 |
| 2021/0300105 | A1 | 9/2021 | Fujino |

FOREIGN PATENT DOCUMENTS

| | | | |
|---|---|---|---|
| JP | 2010117381 A | | 5/2010 |
| JP | 2011115974 A | * | 6/2011 |
| JP | 2011118190 A | | 6/2011 |
| JP | 2013008113 A | * | 1/2013 |
| JP | 2013109129 A | | 6/2013 |
| JP | 5828182 B2 | | 12/2015 |
| WO | 2018079606 A1 | | 5/2018 |
| WO | 2020004155 A1 | | 1/2020 |

OTHER PUBLICATIONS

Apr. 5, 2022, International Search Report issued in the International Patent Application No. PCT/JP2022/002846.
Aug. 3, 2023, International Preliminary Report on Patentability issued in the International Patent Application No. PCT/JP2022/002846.

* cited by examiner

*Primary Examiner* — Donald L Raleigh
(74) *Attorney, Agent, or Firm* — KENJA IP LAW PC

(57) ABSTRACT

An optical layered body comprising: a polarized light separation layer including a reflective linear polarizer; a first phase difference layer, and a first display layer containing a resin having cholesteric regularity, in this order; an average degree of polarization of the polarized light separation layer at a wavelength of 400 nm to 680 nm being 0.50 or more.

12 Claims, 4 Drawing Sheets

OPTICAL LAMINATE, METHOD FOR DETERMINING AUTHENTICITY THEREOF, AND ARTICLE

TECHNICAL FIELD

The present invention relates to an optical layered body and a method for determining authenticity thereof, and an article including the optical layered body.

BACKGROUND ART

In order to determine whether an article is an authentic product supplied from an original manufacturer, an identification medium that cannot be easily replicated is generally provided in the article. As such an identification medium, an optical layered body formed using a resin having cholesteric regularity has been known (Patent Literature 1). Techniques like those described in Patent Literatures 2 and 3 have also been known.

CITATION LIST

Patent Literature

Patent Literature 1: International Publication No. 2020/004155
Patent Literature 2: International Publication No. 2018/079606
Patent Literature 3: Japanese Patent No. 5828182

SUMMARY OF THE INVENTION

Technical Problem

In general, the resin having cholesteric regularity can reflect circularly polarized light having either a clockwise rotation direction or a counterclockwise rotation direction and transmit circularly polarized light having a rotation direction opposite to the above rotation direction. Patent Literature 1 proposes an optical layered body in which, using the function of the resin having cholesteric regularity, an image visually recognized when one surface thereof is observed differs from an image visually recognized when another surface thereof is observed although the optical layered body is transparent or translucent.

When reflected light observation of the front surface of the optical layered body described in Patent Literature 1 is carried out, a layer provided on the front surface can be visually recognized. However, when the optical layered body is turned over and reflected light observation of the rear surface thereof is carried out, the visibility of the layer provided on the front surface can be reduced although the optical layered body itself is transparent or translucent. Therefore, although the optical layered body is transparent or translucent, an image visually recognized when reflected light observation of the front surface is carried out can differ from an image visually recognized when reflected light observation of the rear surface is carried out. Unless otherwise specified, the "reflected light observation" means observation in which reflected light of illumination light is observed.

However, in the optical layered body described in Patent Literature 1, concealability of a layer provided on a surface opposite with respect to a surface of which reflected light observation is carried out is low. Specifically, when reflected light observation of the front surface of the optical layered body is carried out, the layer provided on the rear surface can be slightly seen. When reflected light observation of the rear surface of the optical layered body is carried out, the layer provided on the front surface can be slightly seen. When the concealability of the layer provided on the surface opposite with respect to the surface of which reflected light observation is carried out is low, an authenticity identification capability may be reduced.

The present invention has been made in view of the above-mentioned problems. An object of the present invention is to provide an optical layered body, having excellent concealability of a layer provided on a surface opposite with respect to a surface of which reflected light observation is carried out, and a method for determining authenticity thereof, and an article including the optical layered body.

Solution to Problem

The present inventor has intensively studied to solve the aforementioned problems. As a result, the inventor has found that the aforementioned problems can be solved by an optical layered body including a polarized light separation layer including a reflective linear polarizer, a first phase difference layer, and a first display layer containing a resin having cholesteric regularity in this order, wherein an average degree of polarization of the polarized light separation layer at a wavelength of 400 nm to 680 nm is within a specific range. Thus, the present invention has been completed.

Specifically, the present invention includes as follows.

<1> An optical layered body comprising: a polarized light separation layer including a reflective linear polarizer; a first phase difference layer, and a first display layer containing a resin having cholesteric regularity, in this order,
  an average degree of polarization of the polarized light separation layer at a wavelength of 400 nm to 680 nm being 0.50 or more.

<2> The optical layered body according to <1>, wherein a slow axis of the first phase difference layer and a polarized light transmission axis of the reflective linear polarizer form an angle within a range of 45°±5°.

<3> The optical layered body according to <1> or <2>, wherein the first phase difference layer has an in-plane retardation of ¼ wavelength.

<4> The optical layered body according to any one of <1> to <3>, wherein the first display layer contains a flake of a resin having cholesteric regularity.

<5> The optical layered body according to any one of <1> to <4>, wherein the reflective linear polarizer is a multi-layer reflective polarizer.

<6> The optical layered body according to any one of <1> to <4>, wherein the reflective linear polarizer is a wire grid polarizer.

<7> The optical layered body according to any one of <1> to <6>, comprising a second display layer containing a resin having cholesteric regularity, a second phase difference layer, the polarized light separation layer, the first phase difference layer, and the first display layer, in this order.

<8> The optical layered body according to <7>, wherein:
  a slow axis of the second phase difference layer and a polarized light transmission axis of the reflective linear polarizer form an angle within a range of 45°±5°; and
  a slow axis of the first phase difference layer and a slow axis of the second phase difference layer form an angle within a range of 90°±5°.

<9> The optical layered body according to <7> or <8>, wherein the second phase difference layer has an in-plane retardation of ¼ wavelength.

<10> The optical layered body according to any one of <7> to <9>, wherein the second display layer contains a flake of a resin having cholesteric regularity.

<11> A method for determining authenticity of the optical layered body according to any one of <1> to <10>, the method comprising the steps of:
observing, from the first display layer side, reflected light of light for illuminating the first display layer side of the optical layered body to determine whether the first display layer can be visually recognized; and
observing, from a side opposite with respect to the first display layer, reflected light of light for illuminating the side of the optical layered body opposite with respect to the first display layer to determine whether the first display layer can be visually recognized.

<12> A method for determining authenticity of the optical layered body according to any one of <7> to <10>, the method comprising the steps of:
observing, from the first display layer side, reflected light of light for illuminating the first display layer side of the optical layered body to determine whether the first display layer and the second display layer can be visually recognized; and
observing, from a side opposite with respect to the first display layer, reflected light of light for illuminating the side of the optical layered body opposite with respect to the first display layer to determine whether the first display layer and the second display layer can be visually recognized.

<13> An article comprising the optical layered body according to any one of <1> to <10>.

Advantageous Effects of Invention

According to the present invention, an optical layered body, having excellent concealability of a layer provided on a surface opposite with respect to a surface of which reflected light observation is carried out, and a method for determining authenticity thereof, and an article including the optical layered body can be provided.

DESCRIPTION OF EMBODIMENTS

Hereinafter, the present invention will be described in detail with reference to embodiments and examples. However, the present invention is not limited to embodiments and examples described below, and may be freely modified for implementation without departing from the scope of claims of the present invention and the scope of their equivalents.

In the following description, an in-plane retardation Re of a layer is a value represented by $Re=(nx-ny)\times d$ unless otherwise specified. Herein, nx represents a refractive index in a direction in which the maximum refractive index is given among directions (in-plane directions) perpendicular to the thickness direction of the layer, ny represents a refractive index in a direction, among the above-mentioned in-plane directions, perpendicular to the direction giving nx, and d represents the thickness of the layer. The measurement wavelength is 550 nm unless otherwise specified.

In the following description, a visible wavelength range refers to a wavelength range of 400 nm or longer and 780 nm or shorter, unless otherwise specified.

In the following description, an angle formed by optical axes (polarized light transmission axis, slow axis, etc.) refers to an angle as seen in the thickness direction.

In the following description, the term "circularly polarized light" may include elliptically polarized light within a range in which the advantageous effects of the present invention are not significantly impaired, unless otherwise specified.

1. First Embodiment of Optical Layered Body

Figure 1:
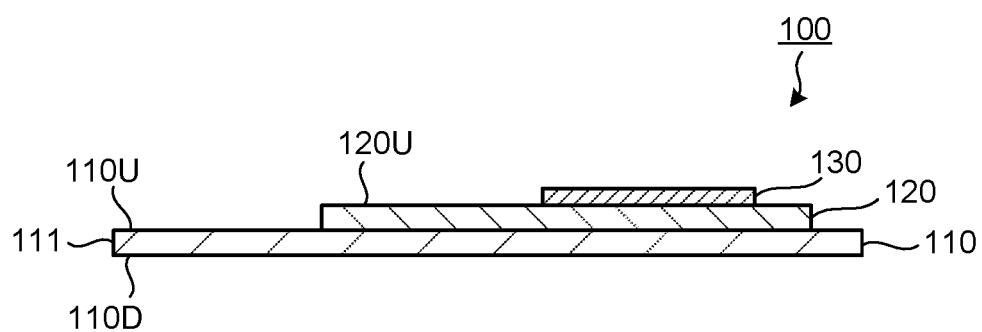
FIG. 1 is a cross-sectional view schematically illustrating an optical layered body according to a first embodiment of the present invention.

FIG. 1 is a cross-sectional view schematically illustrating an optical layered body 100 according to a first embodiment of the present invention.

As shown in FIG. 1, the optical layered body 100 according to the first embodiment of the present invention includes a polarized light separation layer 110 including a reflective linear polarizer 111, a first phase difference layer 120, and a first display layer 130, in this order in a thickness direction.

Specifically, the polarized light separation layer 110 has a first surface 110U as a main surface and a second surface 110D as another main surface opposite with respect to the first surface 110U. The first phase difference layer 120 is disposed directly or indirectly on one of the first surface 110U and the second surface 110D. A layer disposed "directly" on a surface means that another layer is not present between the surface and the layer. A layer disposed "indirectly" on a surface means that another layer (adhesion layer, and the like) is present between the surface and the layer. In the present embodiment, an example in which the first phase difference layer 120 is disposed on the first surface 110U of the polarized light separation layer 110 is shown for description.

The first phase difference layer 120 may be disposed on a part of the first surface 110U of the polarized light separation layer 110 or on the entire first surface 110U. As viewed in the thickness direction, the first phase difference layer 120 is usually disposed so as to overlap with the reflective linear polarizer 111 of the polarized light separation layer 110. That is, in in-plane directions perpendicular to the thickness direction of the optical layered body 100, a position of a part or the entirety of the first phase difference layer 120 is usually the same as a position of a part or the entirety of the reflective linear polarizer 111. In the present embodiment, as viewed in the thickness direction, the entirety of the first phase difference layer 120 overlaps with a part of the reflective linear polarizer 111 of the polarized light separation layer 110. Herein, a certain layer "overlapping" with another layer means that, when a planer positional relationship between the layers is observed in the thickness direction, the layers are present at least partly at the same planar position.

The first display layer 130 is disposed directly or indirectly on a surface 120U of the first phase difference layer 120 opposite with respect to the polarized light separation layer 110. The first display layer 130 may be disposed on a part of the surface 120U of the first phase difference layer 120 or on the entirety of the surface 120U. As viewed in the thickness direction, the first display layer 130 is usually disposed so as to overlap with both the reflective linear polarizer 111 of the polarized light separation layer 110 and the first phase difference layer 120. That is, in in-plane directions perpendicular to the thickness direction of the optical layered body 100, a position of a part or the entirety of the first display layer 130 is usually the same as a position of a part or the entirety of the reflective linear polarizer 111. In in-plane directions perpendicular to the thickness direction of the optical layered body 100, a position of a part or the entirety of the first display layer 130 is usually the same as a position of a part or the entirety of the first phase difference layer 120. In the present embodiment, as viewed in the thickness direction, the entirety of the first display layer 130 overlaps with a part of the reflective linear polarizer 111 of the polarized light separation layer 110, and overlaps with a part of the first phase difference layer 120.

The first display layer 130 may generally have a planer shape according to the design of the optical layered body 100. Unless otherwise specified, the "planer shape" represents a shape viewed in the thickness direction. Examples of the planer shape of the first display layer 130 may include, but are not limited to, characters, numerals, symbols, and figures.

(1.1. Polarized Light Separation Layer)

The polarized light separation layer 110 includes the reflective linear polarizer 111. When the reflective linear polarizer 111 is irradiate with unpolarized light, the reflective linear polarizer 111 can reflect linearly polarized light having a vibration direction perpendicular to a polarized light transmission axis of the reflective linear polarizer 111, and transmit linearly polarized light having a vibration direction parallel to the polarized light transmission axis. Thus, when the polarized light separation layer 110 including the reflective linear polarizer 111 is irradiate with unpolarized light, the polarized light separation layer 110 can reflect linearly polarized light having the vibration direction perpendicular to the polarized light transmission axis of the reflective linear polarizer 111, and transmit linearly polarized light having the vibration direction parallel to the polarized light transmission axis. The vibration direction of linearly polarized light means the vibration direction of electric field of the linearly polarized light.

The polarized light separation layer 110 according to the present embodiment has a particular high degree of polarization over a wide range in the visible wavelength range. Specifically, the average degree of polarization of the polarized light separation layer 110 at a wavelength of 400 nm to 680 nm is usually 0.50 or more, preferably 0.60 or more, more preferably 0.70 or more, and particularly preferably 0.80 or more, and is usually 1.00 or less. The optical layered body 100 including the polarized light separation layer 110 having an average degree of polarization within this range can effectively enhance the concealability of the first display layer 130 when reflected light observation of the surface (the second surface 110D) opposite with respect to the first display layer 130.

The degree of polarization P of the polarized light separation layer 110 at a certain wavelength represents the ratio of polarized light contained in transmitted light obtained when the polarized light separation layer 110 is irradiated with unpolarized light having the wavelength. Specifically, from the maximum transmittance Tmax and the minimum transmittance Tmin among the transmittance of linearly polarized light that has a vibration direction in any angular direction θ (0°≤θ<360°) through the polarized light separation layer 110, the transmittance of elliptically polarized light that has an ellipse long-axis direction in any angular direction θ (0°≤θ<360°) through the polarized light separation layer 110, the transmittance of clockwise circularly polarized light through the polarized light separation layer 110, and the transmittance of counterclockwise circularly polarized light through the polarized light separation layer 110, the degree of polarization P is determined by "P=(Tmax−Tmin)/(Tmax+Tmin)". This degree of polarization P may be measured with a polarimeter ("AxoScan high-speed high-precision Mueller matrix polarimeter" manufactured by AXOmetrics, Inc.). Specifically, the degree of polarization P can be obtained from an output of measurement item "TOTAL POLARIZANCE" in measurement in the thickness direction (incidence angle: 0°) of the polarized light separation layer 110 with the polarimeter. The degree of polarization P is measured in a wavelength range of 400 nm to 680 nm, and an average thereof can be calculated as an average degree of polarization.

From the viewpoint of achieving a display mode capable of being viewed with the naked eye, the wavelength range in which the polarized light separation layer 110 can reflect linearly polarized light is preferably within the visible wavelength region. In the following description, a wavelength range in which the polarized light separation layer 110 can reflect linearly polarized light may be referred to as a "polarized light separation wavelength range". The polarized light separation layer 110 can have a reflectance of usually 40% or more, and preferably 45% or more, and usually 50% or less with respect to unpolarized light in the polarized light separation wavelength range in which linearly polarized light can be reflected.

It is preferable that the polarized light separation layer 110 has high reflectance over a wide range in the visible wavelength range. Specifically, the average reflectance of the polarized light separation layer 110 with respect to unpolarized light in a wavelength range of 400 nm to 680 nm is usually 40% or more, and preferably 45% or more, and is usually 50% or less. A reflectance can be measured with an ultraviolet-visible spectrophotometer (for example, "UV-Vis 550" manufactured by JASCO Corporation). The polarized light separation wavelength range may be determined by the same method as a method for determining a first display wavelength range of the first display layer 130 to be described below.

Examples of the reflective linear polarizer 111 may include a multi-layer reflective polarizer. The multi-layer reflective polarizer is a reflective linear polarizer including a plurality of layers having different refractive index anisotropy in in-plane directions perpendicular to the thickness direction. Examples thereof may include those described in Japanese Translation of PCT Patent Application Publication No. Heir. 9-507308 A and Michael F. Weber, Carl A. Stover, Larry R. Gilbert, Timothy, J. Nevitt, Andrew J. Ouderkirk, "Giant Birefringent Optics in Multilayer Polymer Mirrors", SCIENCE vol. 287, 31 Mar. 2000, pp. 2451 to 2456.

The multi-layer reflective polarizer usually includes a plurality of layers A having refractive index anisotropy and a plurality of layers B having refractive index anisotropy different from that of the layers A, where the layers A and B are alternately arranged in the thickness direction. In one direction X perpendicular to the thickness direction, the refractive index of the layers A is different from the refractive index of the layers B. In a direction Y perpendicular to both the thickness direction and the direction X, the refractive index of the layers A is the same as the refractive index of the layers B. The multi-layer reflective polarizer including the layers A and the layers B that are alternately arranged can reflect linearly polarized light having a vibration direction in the direction X and transmit linearly polarized light having a vibration direction in the direction Y. The wavelength of linearly polarized light reflected by the multi-layer reflective polarizer can be adjusted by the thicknesses of the layers A and the layers B. As such a multi-layer reflective polarizer, a commercially available product may be used. For example, "DBEF" manufactured by 3M Company may be used.

Additional examples of the reflective linear polarizer 111 may include a wire grid polarizer. The wire grid polarizer is a reflective linear polarizer including a plurality of wires arranged in parallel. The wires are generally formed of a metal. The wire grid polarizer usually includes a plurality of metal wires arranged in parallel at a constant pitch. The wire grid polarizer can reflect linearly polarized light having a vibration direction parallel to the longitudinal direction of the wires, and transmit linearly polarized light having a vibration direction perpendicular to the longitudinal direction. The wavelength of linearly polarized light reflected by the wire grid polarizer can be adjusted by the pitch of the wires. As such a wire grid polarizer, a commercially available product may be used. For example, "wire grid polarizing film" available from Edmund Optics Inc., may be used.

The polarized light separation layer 110 may include an optional layer (not shown) without significantly impairing the advantageous effects of the present invention. Examples of the optional layer may include a support layer supporting the reflective linear polarizer 111, and an adhesion layer (including a tackiness layer) for adhesion of the reflective linear polarizer 111 onto another layer. It is preferable that the optional layer has a small in-plane retardation. Specifically, the in-plane retardation of the optional layer is preferably 20 nm or less, more preferably 10 nm or less, particularly preferably 5 nm or less, and ideally 0 nm. Since a layer having a small in-plane retardation is a layer having optical isotropy, a change in a polarization state by the optional layer can be suppressed. It is preferable that the polarized light separation layer 110 includes only the reflective linear polarizer 111.

The thickness of the polarized light separation layer 110 is preferably 5 μm or more, more preferably 20 μm or more, and particularly preferably 50 μm or more, and preferably 1,000 μm or less, more preferably 500 μm or less, and particularly preferably 100 μm or less.

(1.2. First Phase Difference Layer)

The first phase difference layer 120 has refractive index anisotropy. The polarization state of linearly polarized light having been transmitted through the polarized light separation layer 110 can thus be changed by transmission through the first phase difference layer 120. Linearly polarized light can be usually converted into circularly polarized light by transmission through the first phase difference layer 120.

It is preferable that the in-plane retardation of the first phase difference layer 120 is set to a range where the concealability of the first display layer 130 can be enhanced. Specifically, it is preferable that the first phase difference layer 120 has an in-plane retardation of ¼ wavelength. The in-plane retardation of ¼ wavelength at a measurement wavelength of 550 nm is preferably 110 nm or more, more preferably 120 nm or more, and particularly preferably 125 nm or more, and is preferably 165 nm or less, more preferably 155 nm or less, and particularly preferably 150 nm or less. The optical layered body 100 including the first phase difference layer 120 having the in-plane retardation of ¼ wavelength can effectively enhance the concealability of the first display layer 130 when reflected light observation of the surface (the second surface 110D) opposite with respect to the first display layer 130 is carried out.

It is preferable that the first phase difference layer 120 has reverse wavelength dispersion. The reverse wavelength dispersion means that in-plane retardations Re(450) and Re(550) at measurement wavelengths of 450 nm and 550 nm satisfy the following expression (R1). In particular, it is preferable that in-plane retardations Re(450), Re(550), and Re(650) of the first phase difference layer 120 at measurement wavelengths of 450 nm, 550 nm, and 650 nm satisfy the following expression (R2).

$$Re(45) < Re(550) \tag{R1}$$

$$Re(450) < Re(550) < Re(650) \tag{R2}$$

The first phase difference layer 120 having reverse wavelength dispersion can exhibit the optical function over a wide wavelength range. Therefore, the first phase difference layer 120 having reverse wavelength dispersion can function as a ¼ wavelength plate over a wide range in the visible wavelength range. Thus, in a wide wavelength range, the polarization state of light that is transmitted through the first phase difference layer 120 can be appropriately changed. Consequently, the concealability of the first display layer 130 can be effectively enhanced when reflected light observation of the surface (the second surface 110D) opposite with respect to the first display layer 130 is carried out.

It is preferable that the first phase difference layer 120 has a slow axis that forms an angle of a specific range with respect to the polarized light transmission axis of the reflective linear polarizer 111. It is preferable that the angle is set such that linearly polarized light having been transmitted through the polarized light separation layer 110 is converted into circularly polarized light by transmission through the first phase difference layer 120. It is particularly preferable that the angle is set such that linearly polarized light having been transmitted through the polarized light separation layer 110 is converted into circularly polarized light that can be transmitted through the first display layer 130 by transmission through the first phase difference layer 120. It is preferable that the angle formed between the slow axis of the first phase difference layer 120 and the polarized light transmission axis of the reflective linear polarizer 111 specifically falls within the range of 45°±5°. More specifically, the range of the angle is preferably 400 or more, more preferably 42° or more, and particularly preferably 43° or more, and is preferably 50° or less, more preferably 48° or less, and particularly preferably 470 or less. The optical layered body 100 including such a first phase difference layer 120 can effectively enhance the concealability of the first display layer 130 when reflected light observation of the surface (the second surface 110D) opposite with respect to the first display layer 130 is carried out.

Examples of the first phase difference layer 120 may include a stretched film. A stretched film refers to a film obtained by stretching a resin film, and a desired in-plane retardation can be obtained by appropriately adjusting factors such as the type of resin, stretching conditions, and thickness. A thermoplastic resin is usually used as the resin. The thermoplastic resin may contain a polymer and, as necessary, an optional component. Examples of the polymer may include a polycarbonate, a polyethersulfone, a polyethylene terephthalate, a polyimide, a polymethyl methacrylate, a polysulfone, a polyarylate, a polyethylene, a polyphenylene ether, a polystyrene, a polyvinyl chloride, cellulose diacetate, cellulose triacetate, and an alicyclic structure-containing polymer. As the polymer, one type thereof may be solely used, and two or more types thereof may be used in combination at any ratio. Among these, an alicyclic structure-containing polymer is preferable from the viewpoint of transparency, low hygroscopicity, size stability, and processability. The alicyclic structure-containing polymer refers to a polymer having an alicyclic structure in its main chain and/or side chains, and for example, those described in Japanese Patent Application Laid-Open No. 2007-057971 A may be used.

The stretched film as the first phase difference layer 120 may be produced by producing a resin film from the above-mentioned resin, and then stretching the resin film. Specific examples of the method for producing the first phase difference layer 120 as a stretched film may include the method described in International Publication No. 2019/059067.

The thickness of the stretched film is not particularly limited, and is preferably 5 µm or more, more preferably 10 µm or more, and particularly preferably 20 µm or more, and is preferably 1 mm or less, more preferably 500 µm or less, and particularly preferably 200 µm or less.

Additional examples of the first phase difference layer 120 may include a liquid crystal cured layer. A liquid crystal cured layer refers to a layer formed of a cured product of a liquid crystal composition containing a liquid crystal compound. Materials referred to as a "liquid crystal composition" include materials consisting of a single substance as well as mixtures of two or more substances. Generally, a liquid crystal cured layer can be obtained by forming a layer of a liquid crystal composition, orienting molecules of a liquid crystal compound contained in the layer of the liquid crystal composition, and then curing the layer of the liquid crystal composition. This liquid crystal cured layer can exhibit a desired in-plane retardation by appropriately adjusting factors such as the type of liquid crystal compound, the orientation state of the liquid crystal compound, and the thickness of the layer.

Although the type of the liquid crystal compound is not limited, when it is desired to obtain the first phase difference layer 120 having reverse wavelength dispersion, a liquid crystal compound having reverse wavelength dispersion is preferably used. A liquid crystal compound having reverse wavelength dispersion refers to a liquid crystal compound that exhibits a reverse wavelength dispersion property when homogeneously oriented. Homogeneous orientation of the liquid crystal compound means that a layer containing the liquid crystal compound is formed, and the directions in which the maximum refractive index in the refractive index ellipsoid of the molecules of the liquid crystal compound in the layer is given are oriented in one certain direction parallel with the plane of the layer. Specific examples of the liquid crystal compound having reverse wavelength dispersion may include compounds described in International Publication No. 2014/069515 and International Publication No. 2015/064581.

Although the thickness of the liquid crystal cured layer is not particularly limited, the thickness is preferably 0.5 µm or more, and more preferably 1.0 µm or more, and is preferably 10 µm or less, more preferably 7 µm or less, and particularly preferably 5 µm or less.

(1.3. First Display Layer)

The first display layer 130 contains a resin having cholesteric regularity. Hereinafter, the resin having cholesteric regularity may be referred to as a "cholesteric resin" as appropriate. Since the cholesteric resin is usually formed in a layer shape, the first display layer 130 may contain a layer of the cholesteric resin.

The cholesteric regularity is a structure in which the angle of molecular axes in stacking planes are shifted (twisted) as the planes are observed sequentially passing through the stacked planes, such that molecular axes in a certain first plane are oriented in a certain direction, molecular axes in a subsequent plane stacking on the first plane are oriented in a direction shifted by a small angle with respected to that of the first plane, and molecular axes in still another plane are oriented in a direction of a further shifted angle. That is, when molecules inside a layer have cholesteric regularity, molecular axes of the molecules on a first plane inside the layer are aligned along a constant direction. On the subsequent second plane stacking on the first plane inside the layer, a direction of molecular axes is shifted by a slight angle from the direction of the molecular axes on the first plane. On the subsequent third plane further stacking on the second plane, a direction of molecular axes is further shifted by an angle from the direction of the molecular axes on the second plane. In this manner, on the planes disposed in a stacking manner, the angles of the molecular axes on these planes are sequentially shifted (twisted). The structure in which the directions of the molecular axes are twisted in this manner is usually a helical structure and is an optically chiral structure. The cholesteric resin having cholesteric regularity can generally exhibit the circularly polarized light separation function.

The "circularly polarized light separation function" means a function of reflecting circularly polarized light having either a clockwise rotation direction or a counter-clockwise rotation direction and transmitting circularly polarized light having the other rotating direction. In reflection in the cholesteric resin, circularly polarized light is usually reflected while chirality thereof is maintained. In the following description, the wavelength range in which the first display layer 130 can exhibit the circularly polarized light separation function may be referred to as a "first display wavelength range" as appropriate. Therefore, the first display layer 130 has the first display wavelength range in which the first display layer 130 can reflect circularly polarized light having one rotation direction $D_{B1}$ and transmit circularly polarized light having a rotation direction opposite to the rotation direction $D_{B1}$. The reflectance of the first display layer 130 with respect to unpolarized light in the first display wavelength range is usually 40% to 50%.

From the viewpoint of achieving a display mode capable of being viewed with the naked eye, the first display wavelength range of the first display layer 130 is preferably within the visible wavelength range. The wavelength width of the first display wavelength range of the first display layer 130 may be set according to the design of the optical layered body 100. In an example, the specific wavelength width of the first display wavelength range is preferably 70 nm or more, more preferably 100 nm or more, further preferably 200 nm or more, and particularly preferably 400 nm or more, and is preferably 600 nm or less.

The first display wavelength range of the first display layer 130 usually overlaps with the polarized light separation wavelength range of the polarized light separation layer 110. A part of the first display wavelength range may overlap with a part of the polarized light separation wavelength range. The entirety of the first display wavelength range may overlap with a part of the polarized light separation wavelength range. A part of the first display wavelength range may overlap with the entirety of the polarized light separation wavelength range. The entirety of the first display wavelength range may overlap with the entirety of the polarized light separation wavelength range. In particular, it is preferable that the entirety of the first display wavelength range overlaps with a part or the entirety of the polarized light separation wavelength range. It is thus preferable that the polarized light separation wavelength range of the polarized light separation layer 110 includes the first display wavelength range of the first display layer 130. Therefore, it is preferable that the lower limit of the first display wavelength range is equal to or more than the lower limit of the polarized light separation wavelength range, and the upper limit of the first display wavelength range is equal to or less than the upper limit of the polarized light separation wavelength range. The optical layered body 100 that satisfies such a relationship can effectively enhance the concealability of the first display layer 130 when reflected light observation of the surface (the second surface 110D) opposite with respect to the first display layer 130 is carried out.

The first display wavelength range of the first display layer 130 is determined by measuring the reflectance when the first display layer 130 is irradiated with unpolarized light using an ultraviolet-visible spectrophotometer (for example, "UV-Vis 550" manufactured by JASCO Corporation). Hereinafter, a method for measuring the first display wavelength range will be described with an example in detail.

Figure 2:
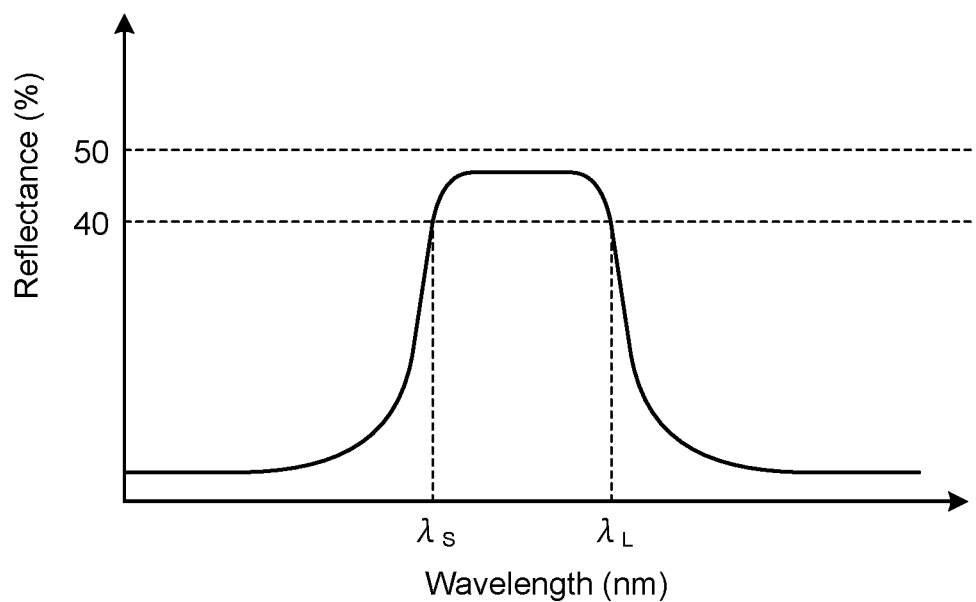
FIG. 2 is a spectrum view illustrating a reflection spectrum of a first display layer according to an example for illustration of a first display wavelength range.

FIG. 2 is a spectrum view illustrating a reflection spectrum of the first display layer 130 in an example for illustration of the first display wavelength range. A case where the first display layer 130 is irradiated with unpolarized light, the reflectance at each wavelength is measured, and the reflection spectrum shown in FIG. 2 is obtained will be described with an example. When this reflection spectrum has a peak at which the reflectance is 40% or more, the wavelength range in which the reflectance is 40% or more is the first display wavelength range. Thus, when a wavelength $\lambda_s$ at which the reflectance is 40% and that is a shorter wavelength and a wavelength $\lambda_L$ at which the reflectance is 40% and that is a longer wavelength are present in the peak, a wavelength range ranging from the wavelength $\lambda_s$ to the wavelength $\lambda_L$ is the first display wavelength range.

The rotation direction $D_{B1}$ of circularly polarized light that can be reflected by the first display layer 130 is usually opposite to the rotation direction $D_{A1}$ of circularly polarized light obtained by transmission of unpolarized light through the polarized light separation layer 110 and the first phase difference layer 120 in this order. When the rotation directions are opposite to each other, the first display layer 130 cannot reflect light that is transmitted through the polarized light separation layer 110 and the first phase difference layer 120 and enters the first display layer 130, or hardly reflects the light. Therefore, the concealability of the first display layer 130 can be effectively enhanced when reflected light observation of the surface (the second surface 110D) opposite with respect to the first display layer 130 is carried out.

A specific wavelength at which the cholesteric resin exhibits the circularly polarized light separation function generally depends on the pitch of the helical structure in the cholesteric resin. The pitch of the helical structure is a distance in a plane normal direction, from the start of gradual shifting of the direction of molecular axes with an angle in the helical structure as proceeding through planes, to the return to the original direction of molecular axes. By changing the size of the pitch of the helical structure, the wavelength at which the circularly polarized light separation function is exhibited can be changed. For example, a method described in Japanese Patent Application Laid-Open No. 2009-300662 A may be used as a method for adjusting a pitch. Specific examples of the method may include a method in which the type of the chiral agent is adjusted or the amount of the chiral agent is adjusted in a cholesteric liquid crystal composition. In particular, when the size of pitch of the helical structure inside the layer is continuously changed, the circularly polarized light separation function over a wide wavelength range can be obtained by a single layer of the cholesteric resin.

Examples of a layer of a the cholesteric resin that can exhibit the circularly polarized light separation function in a wide wavelength range may include (i) a layer of the cholesteric resin in which the size of pitch of the helical structure is changed in a stepwise manner and (ii) a layer of the cholesteric resin in which the size of pitch of the helical structure is continuously changed.

(i) The layer of the cholesteric resin in which the pitch of the helical structure is changed in a stepwise manner can be obtained, for example, by layering a plurality of layers of the cholesteric resin having different pitches of the helical structure. The layering can be performed by previously preparing a plurality of layers of the cholesteric resin having different pitches of the helical structure and then bonding the layers via a tackiness agent or an adhesive. Alternatively, the layering can be performed by forming a certain layer of a cholesteric resin and then sequentially forming other layers of a cholesteric resin on the certain cholesteric resin layer.

(ii) The layer of the cholesteric resin in which the size of pitch of the helical structure is continuously changed can be obtained, for example, by subjecting a layer of a liquid crystal composition to a band broadening treatment including an irradiation treatment with an active energy ray and/or a warming treatment, once or more times, and then curing the resulting layer of the liquid crystal composition. According to the band broadening treatment described above, the pitch of the helical structure can be continuously changed in the thickness direction. The wavelength range (reflection band) in which the layer of the cholesteric resin can exhibit the circularly polarized light separation function can thus be enlarged. Accordingly, the treatment is called as a band broadening treatment.

The layer of the cholesteric resin may be a layer of a single-layer structure including only one a layer or a layer of a multiple-layered structure including two or more layers. The number of layers included in the layer of the cholesteric resin is preferably 1 to 100, and more preferably 1 to 20, from the viewpoint of easy production.

Although there is no limitation on the method for producing the first display layer 130 containing the cholesteric resin, the first display layer 130 may be generally produced using a cholesteric liquid crystal composition. The cholesteric liquid crystal composition refers to a composition capable of exhibiting a liquid crystal phase (cholesteric liquid crystal phase) in which a liquid crystal compound has cholesteric regularity when the liquid crystal compound contained in the liquid crystal composition is oriented. The first display layer 130 can be obtained, for example, as a layer of a cholesteric resin by forming a film of a cholesteric liquid crystal composition on a suitable support and curing the film of the cholesteric liquid crystal composition. Specific examples of the method for producing a layer of a cholesteric resin may include methods described in Japanese Patent Application Laid-Open No. 2014-174471 A and Japanese Patent Application Laid-Open No. 2015-27743 A. In the production method using such a cholesteric liquid crystal composition, the twisting direction in the cholesteric regularity can be appropriately selected depending on the structure of a chiral agent contained in the liquid crystal composition. For example, when the twisting direction is to be a clockwise direction, a cholesteric liquid crystal composition containing a chiral agent for imparting dextrorotation may be used, and when the twisting direction is to be a counterclockwise direction, a cholesteric liquid crystal composition containing a chiral agent that imparts levorotation may be used.

The first display layer 130 may be a layer containing flakes of cholesteric resin. The flake of the cholesteric resin can be used as a pigment containing a minute layer of the cholesteric resin. Therefore, the layer containing the flakes of the cholesteric resin can exhibit the circularly polarized light separation function in the same manner as the layer itself of the cholesteric resin. The first display layer 130 containing the flakes of the cholesteric resin can be easily formed into a free shape by a coating method such as a printing method.

The particle diameter of the flakes of the cholesteric resin is preferably 1 μm or more in order to obtain decorativeness. In particular, it is desirable that the particle diameter of the flakes is equal to or larger than the thickness of the layer containing the flakes. In this case, it is easy to orient respective flakes so that the main surface of the flakes and the layer plane of the layer containing the flakes become in parallel with each other or form an acute angle. Therefore, since the flakes can effectively receive light, the circularly polarized light separation function of the layer containing the flakes can be enhanced. The upper limit of the particle diameter of the flakes is preferably 500 μm or less, and more preferably 100 μm or less, from the viewpoint of obtaining formability and printability. Herein, the particle diameter of a flake refers to a diameter of a circle having the same area as that of the flake.

As the flakes of the cholesteric resin, for example, crushed pieces of the above-described layer of the cholesteric resin may be used. Such flakes can be produced, for example, by the production method described in Japanese Patent No. 6142714.

The layer containing the flake of the cholesteric resin may contain an optional component in combination with the above-mentioned flakes. The optional component may include a binder for binding the flakes. Examples of the binder may include polymers such as a polyester-based polymer, an acrylic-based polymer, a polystyrene-based polymer, a polyamide-based polymer, a polyurethane-based polymer, a polyolefin-based polymer, a polycarbonate-based polymer, and a polyvinyl-based polymer. The amount of the binder is preferably 20 parts by weight or more, more preferably 40 parts by weight or more, and particularly preferably 60 parts by weight or more, and is preferably 1,000 parts by weight or less, more preferably 800 parts by weight or less, and particularly preferably 600 parts by weight or less, relative to 100 parts by weight of the flakes.

The layer containing the flakes of the cholesteric resin may be produced, for example, by applying an ink containing the flakes, a solvent, and as necessary, an optional component, and drying the ink. As the solvent, an inorganic solvent such as water may be used, and an organic solvent such as a ketone solvent, an alkyl halide solvent, an amide solvent, a sulfoxide solvent, a heterocyclic compound, a hydrocarbon solvent, an ester solvent, or an ether solvent may be used. The amount of the solvent is preferably 40 parts by weight or more, more preferably 60 parts by weight or more, and particularly preferably 80 parts by weight or more, and is preferably 1,000 parts by weight or less, more preferably 800 parts by weight or less, and particularly preferably 600 parts by weight or less, relative to 100 parts by weight of the flakes.

The above-mentioned ink may contain monomers of the polymer instead of or in combination with the polymer as a binder. In this case, the layer containing the flakes of the cholesteric resin can be formed by applying and drying an ink, and then polymerizing the monomers. When containing the monomers, the ink preferably contains a polymerization initiator.

The thickness of the first display layer 130 is not particularly limited, and is preferably 5 μm or more, more preferably 10 μm or more, and particularly preferably 20 μm or more, and is preferably 500 μm or less, more preferably 100 μm or less, and particularly preferably 50 μm or less.

(1.4. Visibility of First Display Layer)

Hereinafter, visibility of the first display layer 130 in a case where the optical layered body 100 is observed will be described with an example. In the following example, the rotation direction $D_{B1}$ of circularly polarized light that can be reflected by the first display layer 130 is opposite to the rotation direction $D_{A1}$ of circularly polarized light obtained by transmission of unpolarized light through the polarized light separation layer 110 and the first phase difference layer 120 in this order.

Figure 3:
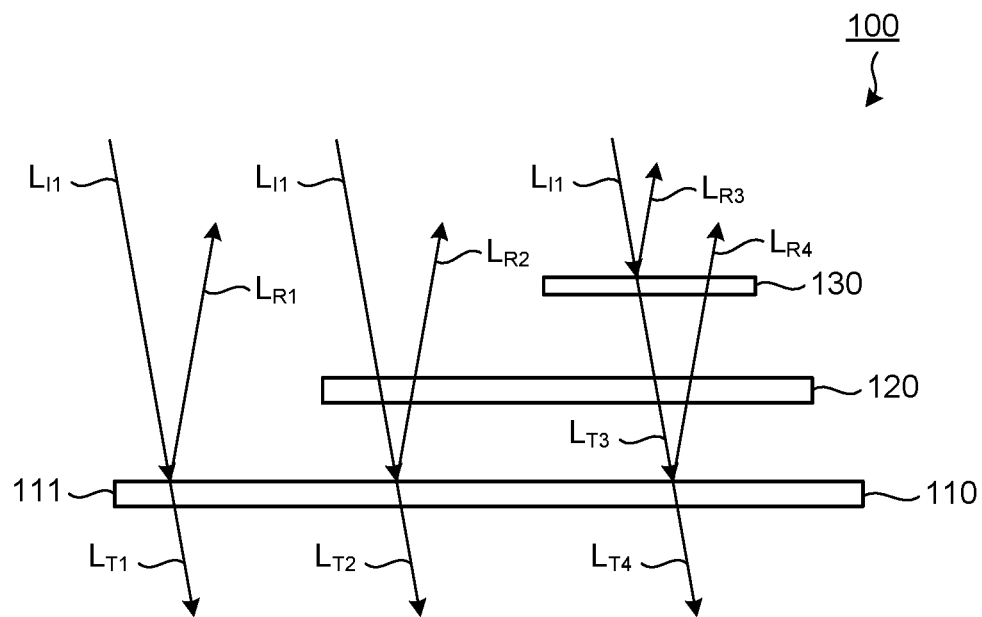
FIG. 3 is an exploded cross-sectional view schematically illustrating the optical layered body according to the first embodiment of the present invention, which is exploded.
Figure 4:
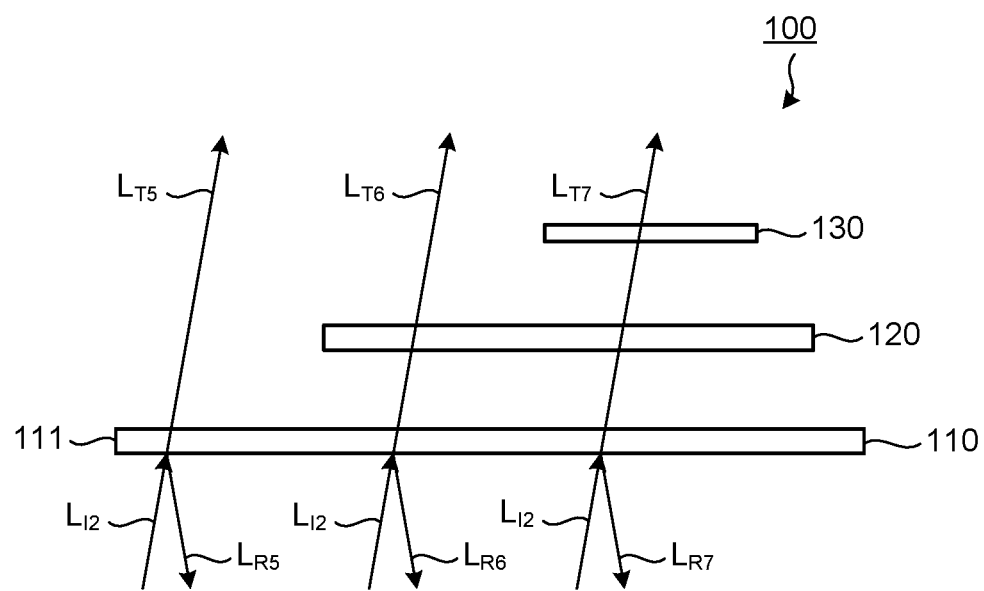
FIG. 4 is an exploded cross-sectional view schematically illustrating the optical layered body according to the first embodiment of the present invention, which is exploded.

FIGS. 3 and 4 are exploded cross-sectional views schematically illustrating the optical layered body 100 according to the first embodiment of the present invention, which is exploded. FIGS. 3 and 4 schematically show paths of light reflected by the polarized light separation layer 110 and the first display layer 130. Although an actual optical layered body 100 may cause various light absorptions and reflections other than those described later, main paths of light will be schematically described in the following description for convenience of description of actions.

FIG. 3 shows a case where the first display layer 130 side of the optical layered body 100 is irradiated with illumination light $L_{I1}$ such as unpolarized light containing both clockwise circularly polarized light and counterclockwise circularly polarized light. As shown in FIG. 3, at an area where the first phase difference layer 120 and the first display layer 130 are not disposed, the illumination light $L_{I1}$ enters the polarized light separation layer 110. A part of the illumination light $L_{I1}$ is reflected by the polarized light separation layer 110 to obtain reflected light $L_{R1}$ as linearly polarized light. Light $L_{T1}$ other than the reflected light $L_{R1}$ is transmitted through the polarized light separation layer 110 and goes out of the optical layered body 100.

As shown in FIG. 3, at an area where the first phase difference layer 120 is disposed but the first display layer 130 is not disposed, the illumination light $L_{I1}$ is transmitted through the first phase difference layer 120 and enters the polarized light separation layer 110. A part of the illumination light $L_{I1}$ is reflected by the polarized light separation layer 110 to obtain reflected light $L_{R2}$. The reflected light $L_{R2}$ is linearly polarized light immediately after reflection by the polarized light separation layer 110. However, since the reflected light is transmitted through the first phase difference layer 120, the reflected light is converted into circularly polarized light. Light $L_{T2}$ other than the reflected light $L_{R2}$ is transmitted through the polarized light separation layer 110 and goes out of the optical layered body 100.

As shown in FIG. 3, at an area where the first display layer 130 is disposed, the first display layer 130, the first phase difference layer 120 and the polarized light separation layer 110 are arranged in this order, and therefore the illumination light $L_{I1}$ enters the first display layer 130. A part of circularly polarized light contained in the illumination light $L_{I1}$ is reflected by the first display layer 130 as circularly polarized light $L_{R3}$ having the rotation direction $D_{B1}$. Light $L_{T3}$ other than the reflected circularly polarized light $L_{R3}$ is transmitted through the first phase difference layer 120 and enters the polarized light separation layer 110. The entering light $L_{T3}$ may include linearly polarized light that can be reflected by the polarized light separation layer 110. Therefore, a part of the light $L_{T3}$ may be reflected to obtain reflected light $L_{R4}$. Light $L_{T4}$ other than the reflected light $L_{R3}$ and light $L_{R4}$ is transmitted through the polarized light separation layer 110 and goes out of the optical layered body 100.

Thus, when the first display layer 130 side of the optical layered body 100 is irradiated with the illumination light $L_{I1}$ containing both clockwise circularly polarized light and counterclockwise circularly polarized light, the circularly polarized light $L_{R3}$ can be reflected by the first display layer 130. Therefore, when reflected light observation of the first display layer 130 side is carried out under irradiation with the illumination light $L_{I1}$, light with strong intensity is reflected by the first display layer 130. Consequently, an observer can visually recognize the circularly polarized light $L_{R3}$ that is reflected by the first display layer 130. Therefore, the observer who performs reflected light observation of the first display layer 130 side of the optical layered body 100 under illumination light containing both clockwise circularly polarized light and counterclockwise circularly polarized light can visually recognize the first display layer 130.

FIG. 4 shows a case where a side of the optical layered body 100 opposite with respect to the first display layer 130 is irradiated with illumination light $L_{I2}$ such as unpolarized light containing both clockwise circularly polarized light and counterclockwise circularly polarized light. As shown in FIG. 4, at an area where the first phase difference layer 120 and the first display layer 130 are not disposed, the illumination light $L_{I2}$ enters the polarized light separation layer 110. A part of the illumination light $L_{I2}$ is reflected by the polarized light separation layer 110 to obtain reflected light $L_{R5}$ as linearly polarized light. Light $L_{T5}$ other than the reflected light $L_{R5}$ is transmitted through the polarized light separation layer 110 and goes out of the optical layered body 100. A part or the entirety of the light $L_{T5}$ that has been transmitted through the polarized light separation layer 110 is linearly polarized light having a vibration direction parallel to the polarized light transmission axis of the reflective linear polarizer 111 included in the polarized light separation layer 110.

As shown in FIG. 4, at the area where the first phase difference layer 120 is disposed but the first display layer 130 is not disposed, a part of the illumination light $L_{I2}$ is reflected by the polarized light separation layer 110 to obtain reflected light $L_{R6}$ as linearly polarized light, in the same manner as the area where the first phase difference layer 120 and the first display layer 130 are not disposed. Light $L_{T6}$ other than the reflected light $L_{R6}$ is transmitted through the polarized light separation layer 110 and the first phase difference layer 120 and goes out of the optical layered body 100. Although a part or the entirety of the light $L_{T6}$ that has been transmitted through the polarized light separation layer 110 is linearly polarized light immediately after transmission through the polarized light separation layer 110, the linearly polarized light is converted into circularly polarized light by transmission through the first phase difference layer 120.

As shown in FIG. 4, at the area where the first display layer 130 is disposed, a part of the illumination light $L_{I2}$ is reflected by the polarized light separation layer 110 to obtain reflected light $L_{R7}$ as linearly polarized light, in the same manner as the area where the first display layer 130 is not disposed. Light $L_{T77}$ other than the reflected light $L_{R7}$ is transmitted through the polarized light separation layer 110 and the first phase difference layer 120 and enters the first display layer 130. Although a part or the entirety of the light $L_{T7}$ that enters the first display layer 130 is linearly polarized light immediately after transmission through the polarized light separation layer 110, the linearly polarized light is converted into circularly polarized light by transmission through the first phase difference layer 120. In this example, the rotation direction $D_{B1}$ of circularly polarized light that can be reflected by the first display layer 130 is opposite to the rotation direction $D_{A1}$ of circularly polarized light obtained by transmission of unpolarized light through the polarized light separation layer 110 and the first phase difference layer 120 in this order. Therefore, the light $L_{T7}$ that enters the first display layer 130 includes none or just a small quantity of circularly polarized light having the rotation direction $D_{B1}$ that can be reflected by the first display layer 130. Accordingly, the entirety or the most of the light $L_{T7}$ is not reflected by the first display layer 130. The entirety or the most of the light $L_{T7}$ is transmitted through the first display layer 130 and goes out of the optical layered body 100.

Thus, when the side of the optical layered body 100 opposite with respect to the first display layer 130 is irradiated with the illumination light $L_{I2}$ containing both clockwise circularly polarized light and counterclockwise circularly polarized light, the light reflection does not occur or occurs only slightly on the first display layer 130. When reflected light observation of the side opposite with respect to the first display layer 130 is carried out under irradiation with the illumination light $L_{I2}$, the observer cannot visually recognize light reflected by the first display layer 130. Therefore, the first display layer 130 cannot be visually recognized by the observer who performs reflected light observation of the side of the optical layered body 100 opposite with respect to the first display layer 130 under illumination light containing both clockwise circularly polarized light and counterclockwise circularly polarized light.

When the first display layer 130 side of the optical layered body 100 is irradiated or the side of the optical layered body 100 opposite with respect to the first display layer 130 is irradiated as described above, light can be partially transmitted through the optical layered body 100. Therefore, the optical layered body 100 can be visually recognized to be a transparent or translucent member. Accordingly, another member can be usually observed through the optical layered body 100. The transparency of the optical layered body 100 is preferably a degree in which, through the optical layered body 100 that is placed on a plane on which a character or a picture is printed, the character or picture printed on the plane can be visually recognizable. When the optical layered body 100 is transparent or translucent, the transmittance of unpolarized light entering the optical layered body 100 may be preferably 20% or more, and more preferably 40% or more. The upper limit of the transmittance is not limited, and for example, may be 90% or less, and usually 50% or less.

Therefore, although the optical layered body 100 according to the present embodiment is transparent or translucent, the first display layer 130 can be visually recognized when reflected light observation of the first display layer side is carried out, but the first display layer 130 cannot be visually recognized when reflected light observation of the side opposite with respect to the first display layer 130 is carried out. Although the optical layered body 100 is transparent or translucent, the optical layered body 100 can thus achieve a specific display mode in which an image of the optical layered body visually recognized when observed from a front surface differs from an image of the optical layered body visually recognized when observed from a rear surface.

In the present embodiment, the polarized light separation layer 110 has a high average degree of polarization. Therefore, when the side of the optical layered body 100 opposite with respect to the first display layer 130 is irradiated with illumination light, the concealability of the first display layer 130 can be enhanced. Specifically, as explained in the aforementioned example, when the rotation direction $D_{B1}$ of circularly polarized light that can be reflected by the first display layer 130 is opposite to the rotation direction $D_{A1}$ of circularly polarized light obtained by transmission of unpolarized light through the polarized light separation layer 110 and the first phase difference layer 120 in this order, the intensity of circularly polarized light having the rotation direction $D_{B1}$ that may be contained in light $L_{T7}$ which reaches the first display layer 130 can be effectively reduced by the polarized light separation layer 110 having a high degree of polarization. Accordingly, when reflected light observation of the side of the optical layered body 100 opposite with respect to the first display layer 130 is carried out under irradiation with illumination light, the concealability of the first display layer 130 can be enhanced. Since the concealability of the first display layer 130 is high, a difference between the image of the optical layered body visually recognized when observed from the front surface and the image of the optical layered body visually recognized when observed from the rear surface can be obvious, and determination of authenticity as described below can be easily performed.

When the first display wavelength range of the first display layer 130 is controlled in the optical layered body 100, the color of circularly polarized light reflected by the first display layer 130 can be controlled, and the color of the first display layer 130 can thus be controlled. Therefore, according to the optical layered body 100, the latitude of color of the first display layer 130 is increased, and various designs can be achieved.

When the optical layered body 100 is set in a direction in which the first display layer 130, the first phase difference layer 120, and the polarized light separation layer 110 are arranged in this order from the observer, the observer can usually see the first display layer 130 side of the optical layered body 100. When the optical layered body 100 is set in a direction in which the first display layer 130, the first phase difference layer 120, and the polarized light separation layer 110 are arranged in this order from a side opposite with respect to the observer, the observer can usually see the side of the optical layered body 100 opposite with respect to the first display layer 130. In the optical layered body 100 described above, an image in a direction in which the observer can see the first display layer 130 side can be visually recognized to be different from an image in a direction in which the observer can see the side opposite with respect to the first display layer 130 as described above. By using a difference between images visually recognized according to the directions of the optical layered body 100, a novel display mode that has not been conventionally achieved can be achieved, and a complex design with an increased latitude can be created. Although the optical layered body 100 is transparent or translucent, a difference between images is made according to the directions of the optical layered body 100 in an environment under illumination light containing both clockwise circularly polarized light and counterclockwise circularly polarized light as described above. This difference can achieve unexpected display for an ordinary observer, and therefore giving a great impact to the observer can be expected.

(1.5. Method for Determining Authenticity)

The optical layered body 100 described above can be used for determination of authenticity using circularly polarized light. For example, the first display layer 130 can be visually recognized in observation through one of a clockwise circularly polarizing plate and a counterclockwise circularly polarizing plate, but the first display layer 130 cannot be visually recognized in observation through the other of the clockwise circularly polarizing plate and the counterclockwise circularly polarizing plate. Therefore, the authenticity of the optical layered body 100 can be determined by observation using a viewer including the clockwise circularly polarizing plate and the counterclockwise circularly polarizing plate.

However, it is often difficult for ordinary users to acquire the viewer. Therefore, it is difficult for the ordinary users to determine authenticity, and the determination of authenticity is performed only by users such as an original manufacturer, a certain retail store, and a public institution. Thus, it is preferable that the determination of authenticity of the optical layered body 100 is performed without using the viewer.

For example, the authenticity of the optical layered body 100 can be determined by a determination method including:
  a first step of observing, from the first display layer 130 side, reflected light of light for illuminating the first display layer 130 side of the optical layered body 100 to determine whether the first display layer 130 can be visually recognized; and
  a second step of observing, from the side opposite with respect to the first display layer 130, reflected light of light for illuminating the side of the optical layered body 100 opposite with respect to the first display layer 130 to determine whether the first display layer 130 can be visually recognized.

In the first step of the above-mentioned determination method, the first display layer 130 side of the optical layered body 100 is irradiated with light containing clockwise circularly polarized light and counterclockwise circularly polarized light. The optical layered body 100 is then observed from the first display layer 130 side to determine whether the first display layer 130 can be visually recognized. When the optical layered body 100 is authentic, the first display layer 130 can be visually recognized.

In the second step of the above-mentioned determination method, the side of the optical layered body 100 opposite with respect to the first display layer 130 is irradiated with light containing clockwise circularly polarized light and counterclockwise circularly polarized light. The optical layered body 100 is then observed from the side opposite with respect to the first display layer 130 to determine whether the first display layer 130 can be visually recognized. When the optical layered body 100 is authentic, the first display layer 130 cannot be visually recognized.

Therefore, in a case where the first display layer 130 can be visually recognized in the first step and the first display layer 130 cannot be visually recognized in the second step, the optical layered body 100 can be determined to be authentic. In other cases, the optical layered body 100 can be determined to be inauthentic. As described above, the simple method without using a viewer can determine the authenticity of the optical layered body 100 according to the embodiment described above.

2. Second Embodiment of Optical Layered Body

Figure 5:
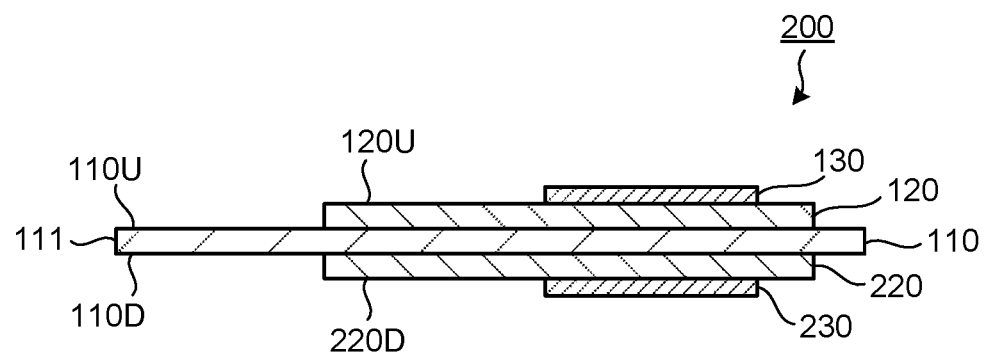
FIG. 5 is a cross-sectional view schematically illustrating an optical layered body according to a second embodiment of the present invention.

FIG. 5 is a cross-sectional view schematically illustrating an optical layered body 200 according to a second embodiment of the present invention.

As shown in FIG. 5, the optical layered body 200 according to the second embodiment of the present invention includes a second display layer 230, a second phase difference layer 220, a polarized light separation layer 110, a first phase difference layer 120, and a first display layer 130, in this order in the thickness direction thereof. The optical layered body 200 is configured in the same manner as the optical layered body 100 according to the first embodiment, except that the optical layered body 200 further includes the second phase difference layer 220 and the second display layer 230 in combination with the polarized light separation layer 110, the first phase difference layer 120, and the first display layer 130. Therefore, the polarized light separation layer 110, the first phase difference layer 120, and the first display layer 130 included in the optical layered body 200 may be the same as those included in the optical layered body 100 according to the first embodiment, and thus the same advantageous effects as those described in the first embodiment can be obtained.

(2.1. Second Phase Difference Layer)

The second phase difference layer 220 is disposed directly or indirectly on the surface of the polarized light separation layer 110 opposite with respect to the first phase difference layer 120 and the first display layer 130. In the present embodiment, an example in which the second phase difference layer 220 is disposed on the second surface 110D of the polarized light separation layer 110 will be described.

The second phase difference layer 220 may be disposed in the same manner as the first phase difference layer 120, except that it is disposed on the surface of the polarized light separation layer 110 opposite with respect to the first phase difference layer 120. With the second phase difference layer 220 configured like this, the same advantages as those of the first phase difference layer 120 can be obtained.

Therefore, the second phase difference layer 220 may be disposed on a part of the second surface 110D of the polarized light separation layer 110, or on the entire second surface 110D. The second phase difference layer 220 is generally disposed so as to overlap with the reflective linear polarizer 111 of the polarized light separation layer 110 as viewed in the thickness direction. In the present embodiment, the entire second phase difference layer 220 overlaps with a part of the reflective linear polarizer 111 of the polarized light separation layer 110 as viewed in the thickness direction.

The second phase difference layer 220 has refractive index anisotropy. The polarization state of linearly polarized light having been transmitted through the polarized light separation layer 110 can thus be changed by transmission through the second phase difference layer 220. Linearly polarized light can be usually converted into circularly polarized light by transmission through the second phase difference layer 220. The in-plane retardation of the second phase difference layer 220 may fall within the same range as that of the first phase difference layer 120. It is thus preferable that the second phase difference layer 220 has an in-plane retardation of ¼ wavelength. It is preferable that the second phase difference layer 220 has reverse wavelength dispersion.

It is preferable that the angle formed between the slow axis of the second phase difference layer 220 and the polarized light transmission axis of the reflective linear polarizer 111 is set so that the linearly polarized light having been transmitted through the polarized light separation layer 110 is transmitted through the second phase difference layer 220 to be converted into circularly polarized light. Furthermore, it is particularly preferable that the angle is set so that the linearly polarized light having been transmitted through the polarized light separation layer 110 is transmitted through the second phase difference layer 220 to be converted into circularly polarized light that can be transmitted through the second display layer 230. The angle range may be the same as the angle range formed between the slow axis of the first phase difference layer 120 and the polarized light transmission axis of the reflective linear polarizer 111. The angle thus preferably falls within the range of 45°±5°.

The angle formed between the slow axis of the first phase difference layer 120 and the slow axis of the second phase difference layer 220 may preferably fall within a range of 90°±5°. More specifically, the angle is preferably 85° or more, more preferably 87° or more, and particularly preferably 88° or more, and is preferably 95° or less, more preferably 93° or less, and particularly preferably 92° or less. In particular, when the rotation direction $D_{B1}$ of circularly polarized light that can be reflected by the first display layer 130 and the rotation direction $D_{B2}$ of circularly polarized light that can be reflected by the second display layer 230 are the same as each other, it is preferable that the angle formed between the slow axis of the first phase difference layer 120 and the slow axis of the second phase difference layer 220 falls within the above-mentioned range.

The angle formed between the slow axis of the first phase difference layer 120 and the slow axis of the second phase difference layer 220 may preferably fall within a range of 0°±5°. More specifically, the angle is preferably −5° or more, more preferably −3° or more, and particularly preferably −2° or more, and is preferably 5° or less, more preferably 3° or less, and particularly preferably 2° or less. In particular, when the rotation direction $D_{B1}$ of circularly polarized light that can be reflected by the first display layer 130 and the rotation direction $D_{B2}$ of circularly polarized light that can be reflected by the second display layer 230 are opposite to each other, it is preferable that the angle formed between the slow axis of the first phase difference layer 120 and the slow axis of the second phase difference layer 220 falls within the above-mentioned range.

The optical layered body 200 that includes the combination of the first phase difference layer 120 and the second phase difference layer 220 having the slow axes of the angular relationship as described above can effectively enhance the concealability of the first display layer 130 when reflected light observation of the surface (the second surface 110D) opposite with respect to the first display layer 130 is carried out. Furthermore, the concealability of the second display layer 230 can be effectively enhanced when reflected light observation of the surface (the first surface 110U) opposite with respect to the second display layer 230 is carried out.

The second phase difference layer 220 may be formed of the same member as the first phase difference layer 120, and may be formed of, for example, a stretched film or a liquid crystal cured layer.

(2.2. Second Display Layer)

The second display layer 230 is disposed directly or indirectly on a surface 220D of the second phase difference layer 220 opposite with respect to the polarized light separation layer 110. The second display layer 230 may be disposed in the same manner as the first display layer 130, except that the second display layer 230 is disposed on the surface 220D of the second phase difference layer 220 opposite with respect to the polarized light separation layer 110. With such a second display layer 230, the same advantages as those of the first display layer 130 can be obtained.

Therefore, the second display layer 230 may be disposed on a part of the surface 220D of the second phase difference layer 220, or on the entire surface 220D. The second display layer 230 is generally disposed so as to overlap with the reflective linear polarizer 111 of the polarized light separation layer 110 and the second phase difference layer 220 as viewed in the thickness direction. In the present embodiment, as viewed in the thickness direction, the entire second display layer 230 overlaps with a part of the reflective linear polarizer 111 of the polarized light separation layer 110, and overlaps with a part of the second phase difference layer 220. The second display layer 230 may generally have a planar shape according to the design of the optical layered body 200. The factors such as the size, shape, position, and number of the second display layer 230 may be different from those of the first display layer 130.

The second display layer 230 contains a cholesteric resin, and thus, has a circularly polarized light separation function. In the following description, the wavelength range in which the second display layer 230 can exhibit the circularly polarized light separation function may be referred to as a "second display wavelength range" as appropriate. Therefore, the second display layer 230 has the second display wavelength range in which the second display layer 230 can reflect circularly polarized light having one rotation direction $D_{B2}$ and transmit circularly polarized light having a rotation direction opposite to the rotation direction $D_{B2}$. The range of the reflectance of the second display layer 230 with respect to unpolarized light in the second display wavelength range may be the same as the range of the reflectance of the first display layer 130 with respect to unpolarized light in the first display wavelength range.

The second display wavelength range of the second display layer 230 may be the same as the first display wavelength range of the first display layer 130. The second display wavelength range is thus preferably within the visible wavelength range. The wavelength width of the second display wavelength range may be within the same range as that for the wavelength width of the first display wavelength range of the first display layer 130. The second display wavelength range generally overlaps with the polarized light separation wavelength range of the polarized light separation layer 110, and in particular, it is preferable that the entirety of the second display wavelength range overlaps with a part or the entirety of the polarized light separation wavelength range. It is thus preferable that the polarized light separation wavelength range of the polarized light separation layer 110 includes the second display wavelength range of the second display layer 230.

The rotation direction $D_{B2}$ of circularly polarized light that can be reflected by the second display layer 230 is usually opposite to the rotation direction $DA_2$ of circularly polarized light obtained by transmission of unpolarized light through the polarized light separation layer 110 and the second phase difference layer 220 in this order. When the rotation directions are opposite to each other, the second display layer 230 cannot reflect light that is transmitted through the polarized light separation layer 110 and the second phase difference layer 220 and enters the second display layer 230, or hardly reflects the light. Therefore, the concealability of the second display layer 230 can be effectively enhanced when reflected light observation of the surface (the first surface 110U) opposite with respect to the second display layer 230 is carried out.

The second display layer 230 may be formed of the same member as that for the first display layer 130, and for example, may be a layer of a cholesteric resin. The second display layer 230 may preferably be a layer containing flakes of a cholesteric resin.

(2.3. Visibility of First Display Layer and Second Display Layer)

With the same mechanism as that described in the first embodiment, the first display layer 130 of the optical layered body 200 according to the second embodiment can be visually recognized by an observer who observes the optical layered body 200 from the first display layer 130 side of the optical layered body 200, but cannot be visually recognized by an observer who observes the optical layered body 200 from the side of the optical layered body 200 opposite with respect to the first display layer 130, under illumination light containing both clockwise circularly polarized light and counterclockwise circularly polarized light.

On the other hand, under illumination light containing both clockwise circularly polarized light and counterclockwise circularly polarized light, the second display layer 230 of the optical layered body 200 can be visually recognized by an observer who observes the optical layered body 200 from the second display layer 230 side of the optical layered body 200, but cannot be visually recognized by an observer who observes the optical layered body 200 from the side of the optical layered body 200 opposite with respect to the second display layer 230, by the same mechanism as that for the first display layer 130.

In the same manner as the optical layered body 100 according to the first embodiment, the optical layered body 200 can be visually recognized to be a transparent or translucent member. Accordingly, another member can be usually observed through the optical layered body 200.

Therefore, although the optical layered body 200 is transparent or translucent, when reflected light observation of the first display layer side is carried out, the first display layer 130 can be visually recognized and the second display layer 230 cannot be visually recognized. Furthermore, when reflected light observation of the second display layer side is carried out, the first display layer 130 cannot be visually recognized and the second display layer 230 can be visually recognized. Although the optical layered body 200 is transparent or translucent, the optical layered body 200 can thus achieve a specific display mode in which an image of the optical layered body visually recognized when observed from a front surface differs from an image of the optical layered body visually recognized when observed from a rear surface.

Since the polarized light separation layer 110 in the optical layered body 200 according to the present embodiment has a high average degree of polarization as in the optical layered body 100 according to the first embodiment, the concealability of the first display layer 130 and the second display layer 230 can be improved. That is, when reflected light observation of the side of the optical layered body 200 opposite with respect to the first display layer 130 is carried out under irradiation with illumination light, the concealability of the first display layer 130 can be enhanced. In addition, when reflected light observation of the side of the optical layered body 200 opposite with respect to the second display layer 230 is carried out under irradiation with illumination light, the concealability of the second display layer 230 can be enhanced. Furthermore, according to the optical layered body 200 of the present embodiment, the same advantages as those of the optical layered body 100 described in the first embodiment can be obtained.

(2.4. Method for Determining Authenticity)

The optical layered body 200 according to the second embodiment can be used for determination of authenticity using circularly polarized light, in the same manner as the optical layered body 100 according to the first embodiment.

For example, the authenticity of the optical layered body 200 may be determined by a determination method including:

a third step of observing, from the first display layer 130 side, reflected light of light for illuminating the first display layer 130 side of the optical layered body 200 to determine whether the first display layer 130 and the second display layer 230 can be visually recognized; and a fourth step of observing, from the side opposite with respect to the first display layer 130, reflected light of light for illuminating the side of the optical layered body 200 opposite with respect to the first display layer 130 to determine whether the first display layer 130 and the second display layer 230 can be visually recognized.

In the third step of the above-mentioned determination method, the first display layer 130 side of the optical layered body 200 is irradiated with light containing clockwise circularly polarized light and counterclockwise circularly polarized light. The optical layered body 200 is then observed from the first display layer 130 side to determine whether the first display layer 130 and the second display layer 230 can be visually recognized. When the optical layered body 200 is authentic, the first display layer 130 can be visually recognized, but the second display layer 230 cannot be visually recognized.

In the fourth step of the above-mentioned determination method, the side of the optical layered body 200 opposite with respect to the first display layer 130 is irradiated with light containing clockwise circularly polarized light and counterclockwise circularly polarized light. The optical layered body 200 is then observed from the side opposite with respect to the first display layer 130 to determine whether the first display layer 130 and the second display layer 230 can be visually recognized. When the optical layered body 200 is authentic, the first display layer 130 cannot be visually recognized, but the second display layer 230 can be visually recognized.

Therefore, in a case where the first display layer 130 can be visually recognized and the second display layer 230 cannot be visually recognized in the third step, and the first display layer 130 cannot be visually recognized and the second display layer 230 can be visually recognized in the fourth step, the optical layered body 200 can be determined to be authentic. In other cases, the optical layered body 200 can be determined to be inauthentic. As described above, the simple method without using a viewer can determine the authenticity of the optical layered body 200 according to the aforementioned embodiment, in the same manner as the optical layered body 100 according to the first embodiment.

3. Modified Examples

The optical layered body is not limited to those described in the first to second embodiments. For example, the optical layered body may further include an optional element in combination with the polarized light separation layer 110, the first phase difference layer 120, the first display layer 130, the second phase difference layer 220, and the second display layer 230 described above.

The optical layered body may include, for example, an optional non-chiral layer containing colorants such as a pigment and a dye that do not have a circularly polarized light separation function. The non-chiral layer may be disposed on the first surface 110U of the polarized light separation layer 110, on the second surface 110D thereof, on the surface 120U of the first phase difference layer 120, or on the surface 220D of the second phase difference layer 220.

Furthermore, the optical layered body may include, for example, an adhesive layer for bonding the above-described layers to each other. Specific examples of the adhesive layer included in the optical layered body may include an adhesive layer between the polarized light separation layer 110 and the first phase difference layer 120, an adhesive layer between the first phase difference layer 120 and the first display layer 130, an adhesive layer between the polarized light separation layer 110 and the second phase difference layer 220, and an adhesive layer between the second phase difference layer 220 and the second display layer 230. The adhesive layer preferably has a low in-plane retardation as in the optional layer that may be included in the polarized light separation layer 110.

Furthermore, for example, the optical layered body may include a cover layer that protects each of the above-described layers. These cover layers are preferably disposed on the outside of the layers described above. As a specific example, the optical layered body may include a cover layer, a second display layer, a second phase difference layer, a polarized light separation layer, a first phase difference layer, a first display layer, and a cover layer, in this order in the thickness direction. Such a cover layer may be formed of a transparent material, for example, a resin.

Furthermore, for example, the optical layered body may include an optional layer which has a low in-plane retardation and is disposed between the above-described respective layers, and an optional layer which has a low in-plane retardation and serves as the outermost layer of the optical layered body, as long as the advantageous effects of the present invention are not significantly impaired. An optional layer having such a low in-plane retardation may be hereinafter referred to as a "low Re layer". The specific in-plane retardation of such a low Re layer is usually 0 nm or more and 5 nm or less. Examples of the position where the low Re layer is disposed may include, but are not limited to, a position on a side of the first display layer opposite with respect to the first phase difference layer, a position between the first display layer and the first phase difference layer, a position between the first phase difference layer and the polarized light separation layer, a position between the polarized light separation layer and the second phase difference layer, a position between the second phase difference layer and the second display layer, and a position on a side of the second display layer opposite with respect to the second phase difference layer. The low Re layer preferably has a high light transmittance, and the total light transmittance of the low Re layer is preferably 80% or more, and more preferably 85% or more. Examples of the material for such a low Re layer may include a hard polyvinyl chloride, a soft polyvinyl chloride, an acrylic resin, glass, a polycarbonate (PC), and a polyethylene terephthalate (PET). The specific material may be appropriately selected depending on the application, desired texture, durability, and mechanical strength of the optical layered body.

<5. Article Including Optical Layered Body>

The above-described optical layered body may be used alone, or may be used as an article in combination with another member. Examples of an article including the optical layered body may include an article including a body member and the optical layered body provided on the body member.

The range of the body member is not restricted. Examples of the body member may include, but are not limited to, textile products such as clothes; leather products such as a bag and a shoe; metal products such as a screw; paper products such as a booklet, a price tag, and packing sheet; plastic products such as a card and a polymer banknote; and rubber products such as a tire. Hereinafter, a booklet (for example, a passport) as an article according to a third embodiment of the present invention as an example will be described.

Figure 6:
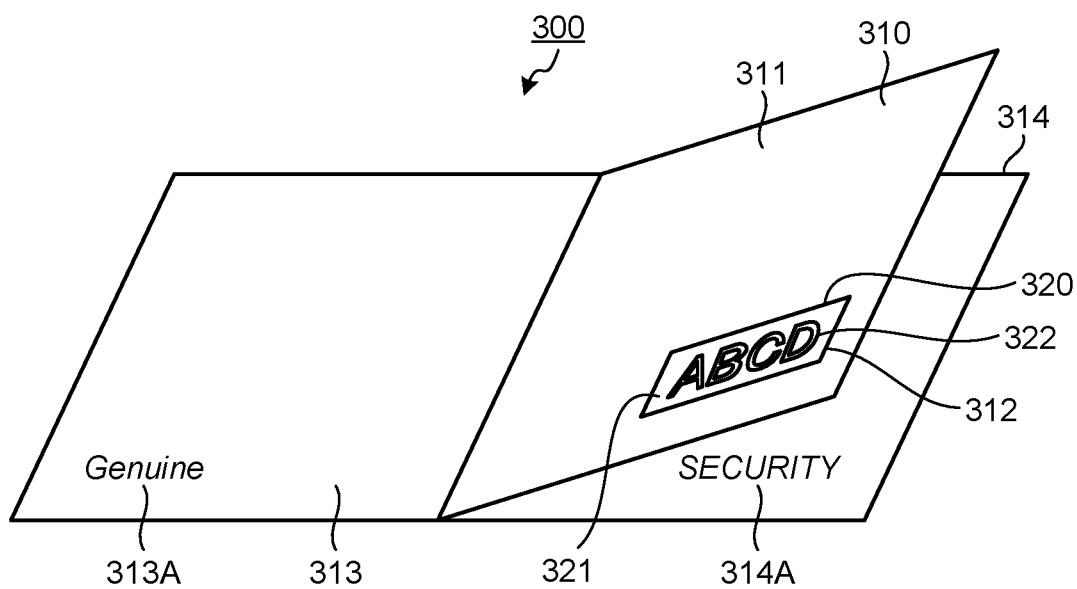
FIG. 6 is a perspective view schematically illustrating a booklet as an article according to a third embodiment of the present invention.
Figure 7:
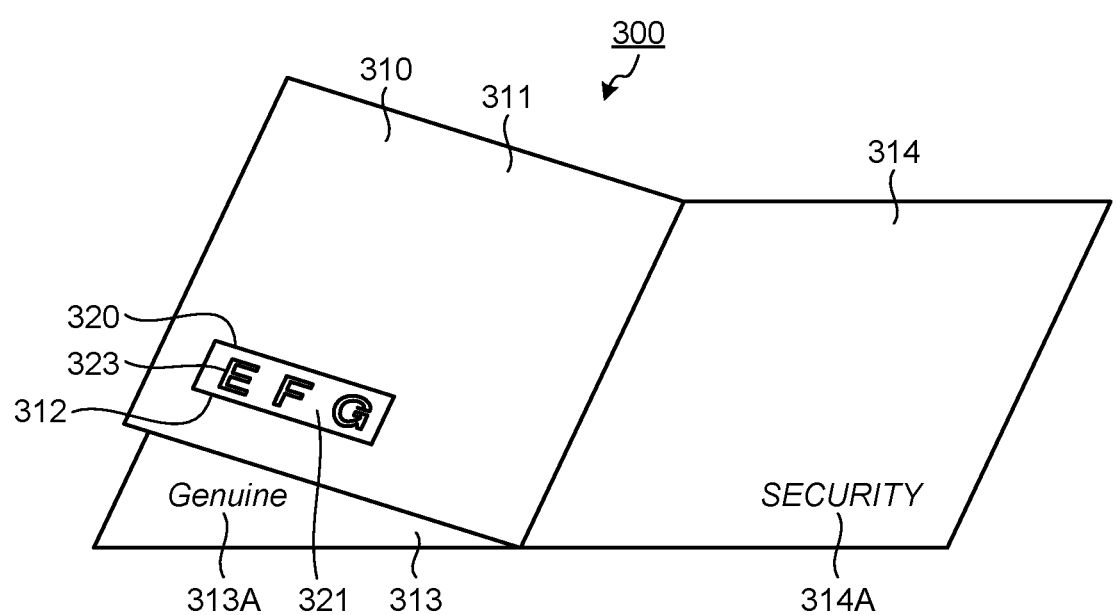
FIG. 7 is a perspective view schematically illustrating the booklet as the article according to the third embodiment of the present invention.

FIGS. 6 and 7 are perspective views schematically illustrating a booklet 300 as an article according to the third embodiment of the present invention.

As shown in FIGS. 6 and 7, the booklet 300 as the article according to the third embodiment of the present invention includes a booklet body 310 as the body member and an optical layered body 320. Specifically, a part of "n"th leaf 311 of the booklet body 310 has an opening 312 passing through the "n"th leaf 311, and the optical layered body 320 is provided in the opening 312. Herein, "n" is an integer of 2 or more.

Character information "Genuine" is printed at an area 313A on which the optical layered body 320 is to be overlaid, on a "n−1"th leaf 313 of the booklet body 310. Character information "SECURITY" is printed at an area 314A on which the optical layered body 320 is to be overlaid, on a "n+1"th leaf 314 of the booklet.

In the present embodiment, the optical layered body 320 is a sheet including a polarized light separation layer 321, a first display layer 322 disposed on one surface of the polarized light separation layer 321 via a first phase difference layer (not illustrated), and a second display layer 323 disposed on another surface of the polarized light separation layer 321 via a second phase difference layer (not illustrated). The first display layer 322 has a planer shape with character string "ABCD", and is formed on a side facing the "n−1"th leaf 313. The second display layer 323 has a planer shape with character string "EFG", and is formed on a side facing the "n+1"th leaf 314.

When the "n"th leaf 311 of the booklet 300 is overlaid on the "n+1"th leaf 314 and observed under irradiation with illumination light containing clockwise circularly polarized light and counterclockwise circularly polarized light, the observer can visually recognize light reflected by the first display layer 322 of the optical layered body 320, but cannot visually recognize light reflected by the second display layer 323. Since the optical layered body 320 is transparent or translucent, illumination light is transmitted through the optical layered body 320, enters the "n+1"th leaf 314, is reflected, is transmitted through the optical layered body 320 again, and can be visually recognized by the observer. Therefore, the observer can visually recognize the character string "ABCD" displayed in the first display layer 322, cannot visually recognize the character string "EFG" displayed in the second display layer 323, and can visually recognize the character information "SECURITY" printed on the leaf 314 through the optical layered body 320.

When the "n"th leaf 311 of the booklet 300 is overlaid on the "n−1"th leaf 313 and observed under irradiation with illumination light containing clockwise circularly polarized light and counterclockwise circularly polarized light, the observer cannot visually recognize light reflected by the first display layer 322 of the optical layered body 320, but can visually recognize light reflected by the second display layer 323. Since the optical layered body 320 is transparent or translucent, illumination light is transmitted through the optical layered body 320, enters the "n−1"th leaf 313, is reflected, is transmitted through the optical layered body 320 again, and can be visually recognized by the observer. Therefore, the observer cannot visually recognize the character string "ABCD" displayed in the first display layer 322, can visually recognize the character string "EFG" displayed in the second display layer 323, and can visually recognize the character information "Genuine" printed on the leaf 313 through the optical layered body 320.

Accordingly, the authenticity of the booklet 300 can be identified and determined using the optical layered body 320, and therefore difficultly in counterfeiting of the booklet 300 can be enhanced. According to the optical layered body 320, a novel display mode that has not been conventionally achieved can be achieved, and giving a great impact to the observer can be expected.

<Example>

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, (23° C. and 1 atm) unless otherwise specified.

In the following description, as the tackiness agent, a transparent tackiness tape "LUCIACS CS9621T" (thickness: 25 μm, visible light transmittance: 90% or more, in-plane retardation: 3 nm or less) manufactured by Nitto Denko Corporation was used, unless otherwise specified.

<Method for Measuring Reflectance of Cholesteric Resin Layer>

The reflectance when unpolarized light (wavelength: 400 nm to 780 nm) entered a cholesteric resin layer was measured with an ultraviolet-visible spectrophotometer (UV-Vis 550, manufactured by JASCO Corporation).

<Method for Measuring Average Degree of Polarization of Layer>

The degree of polarization of a layer to be measured in a measurement wavelength range of 400 nm to 680 nm was measured with a polarimeter ("AxoScan high-speed high-precision Mueller matrix polarimeter" manufactured by AXOmetrics, Inc.). The measurement was performed in the thickness direction (incidence angle: 0°) of the layer, and a value output as measurement item "TOTAL POLARI-ZANCE" of the polarimeter was read to obtain the degree of polarization at each wavelength in the measurement wavelength range. An average of the degree of polarization thus obtained in a wavelength range of 400 nm to 680 nm was calculated as the average degree of polarization of the layer. In a polarized light separation layer including a polarized light elimination layer, the average degree of polarization was determined under a condition in which light was transmitted through a multi-layer reflective polarizer and the polarized light elimination layer of the polarized light separation layer in this order.

<Production Example 1: Production of Ink Composition (W) Containing Silver Cholesteric Pigment (W) that can Reflect Clockwise Circularly Polarized Light>

21.9 parts of a photopolymerizable liquid crystal compound represented by the following formula (X1); 5.47 parts of a photopolymerizable non-liquid crystal compound represented by the following formula (X2); 1.69 parts of a polymerizable chiral agent ("LC756" manufactured by BASF); 0.9 part of a photopolymerization initiator ("Irgacure OXEO2" manufactured by Ciba Japan Co., Ltd.); 0.03 part of a surfactant ("Ftergent 209F" manufactured by Neos Co., Ltd.); and 70 parts of cyclopentanone as a solvent were mixed together to produce a cholesteric liquid crystal composition in liquid state.

violet rays at 5 mJ/cm² to 30 mJ/cm² and a warming treatment at 100° C. to 120° C. were alternately and repeatedly performed a plurality of times to control the wavelength width of the wavelength range, in which a resulting layer can exhibit a circularly polarized light separation function, to a desired band width. The layer of the cholesteric liquid crystal composition was then irradiated with ultraviolet rays at 800 mJ/cm² to cure the layer. As a result, a cholesteric resin layer (W) with a thickness of 5.2 μm was formed on one surface of the long-length PET film.

A reflectance of the obtained cholesteric resin layer (W) was measured by the above-described method. As a result of the measurement, the cholesteric resin layer (W) was found to have a wavelength range in which the reflectance with respect to unpolarized light is 40% or more within a wavelength range of 400 nm to 750 nm. When examined using a circularly polarizing plate, the cholesteric resin layer (W) reflected clockwise circularly polarized light and transmitted counterclockwise circularly polarized light.

The cholesteric resin layer (W) was peeled off from the PET film, pulverized, and classified to obtain a flake-shaped cholesteric pigment (W) with an average particle diameter of 50 μm. The pulverization method adopted was the same method as the examples described in International Publication No. 2020/004155. 15 parts by weight of the obtained cholesteric pigment, 100 parts by weight of a screen ink ("No. 2500 Medium" manufactured by Jujo Chemical Co., Ltd.) as a binder solution, and 10 parts by weight of a <Chemical formula 1>

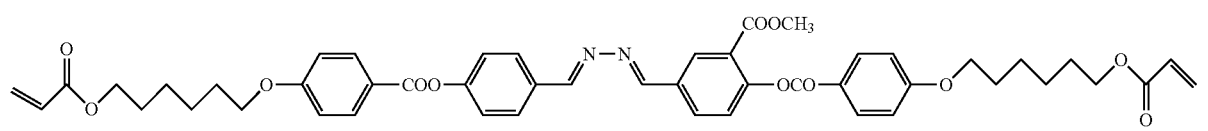

(X1)

<Chemical formula 2>

(X2)

As a support, a long-length polyethylene terephthalate film having isotropy in terms of in-plane refractive index ("PET film A4100" having a thickness of 100 μm manufactured by Toyobo Co., Ltd., which will be referred to as a "PET film" hereinafter) was prepared. The PET film was attached to a feeding unit of a film conveying device, and the following operation was performed while the PET film was being conveyed in a long-length direction. First, a rubbing treatment was performed in the long-length direction parallel to a conveying direction. Subsequently, onto the surface subjected to the rubbing treatment, the prepared cholesteric liquid crystal composition was applied with a die coater. As a result, an uncured film of the cholesteric liquid crystal composition was formed on one surface of the PET film. The film of the cholesteric liquid crystal composition was then subjected to an orientation treatment for 4 minutes at 120° C.

The resulting film of the cholesteric liquid crystal composition was subjected to a band broadening treatment. In the band broadening treatment, irradiation with weak ultradedicated dilution agent (Tetron standard solvent) for the screen ink were mixed to produce an ink composition (w).

<Production Example 2: Production of Ink Composition (G) Containing Green Cholesteric Pigment (G) that can Reflect Counterclockwise Circularly Polarized Light>

Instead of 1.69 parts of the chiral agent ("LC756" manufactured by BASF), 1.69 parts of D-mannitol, 1,4:3,6-dihydro-,2,5-bis[4-[[[6-[[[4-[(1-oxo-2-propene-1-yl)oxy]butoxy]carbonyl]oxy]-2-naphthalenyl]carbonyl]oxy]benzoate] represented by the following formula (X3) was used. Furthermore, the band broadening treatment was not performed. By the same manner as those in Production Example 1 except for the above-described matters, a green cholesteric resin layer (G) capable of reflecting counterclockwise circularly polarized light and transmitting clockwise circularly polarized light, a cholesteric pigment (G) obtained by pulverizing the resulting green cholesteric resin layer (G), and an ink composition (G) containing the cholesteric pigment (G) were produced. A reflectance of the cholesteric resin layer (G) was measured by the above-described method. As a result of the measurement, the cholesteric resin layer (G) was found to have a wavelength range in which the reflectance with respect to unpolarized light is 40% or more within a wavelength range of 505 nm to 585 nm.

<Chemical formula 3>

(X3)

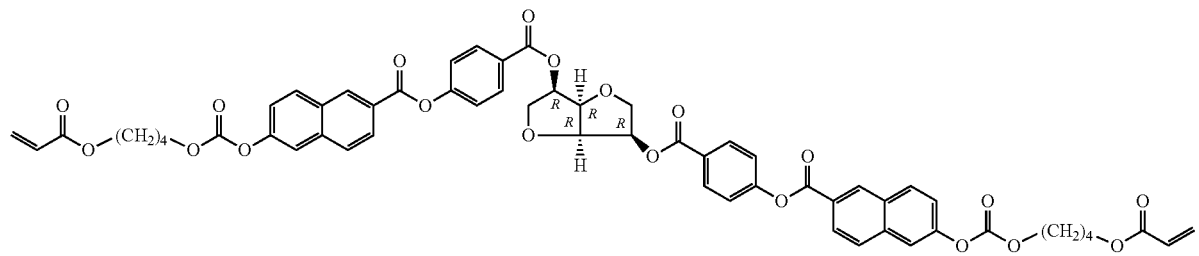

Production Example 3: Production of Polarized Light Separation Layer Including Polarized Light Elimination Layer (Weak)

100.00 parts of a photopolymerizable liquid crystal compound ("LC242" manufactured by BASF), 3.20 parts of a polymerization initiator ("Irgacure OXEO2" manufactured by Ciba Specialty Chemicals Co.), 0.11 part of a surfactant ("KH40" manufactured by AGC Seimi Chemical Co., Ltd.), and 415.48 parts of methyl ethyl ketone were mixed together to obtain a nematic liquid crystal composition in liquid state.

Onto a film made of an alicyclic olefin polymer (hereinafter sometimes referred to as a "COP film"), the above-mentioned nematic liquid crystal composition was applied using a #10 wire bar without any surface treatment such as a rubbing treatment to obtain a layer of the nematic liquid crystal composition.

The nematic liquid crystal composition layer thus obtained was kept at 90° C. for 1 minute to be subjected to an orientation treatment, so that the orientation state of the liquid crystal compound contained in the layer was changed to polydomain orientation. After that, the layer of the nematic liquid crystal composition was cured by UV irradiation at 80 mJ/cm$^2$ for 5 seconds to obtain a multi-layer film including the COP film and the polarized light elimination layer (weak) with a thickness of 2.8 μm.

The polarized light elimination layer (weak) and a multi-layer reflective polarizer ("DBEF" manufactured by 3M Company) were bonded together with a tackiness agent, and the COP film was removed to obtain a polarized light separation layer having a layer configuration of "polarized light elimination layer (weak)/tackiness agent/multi-layer reflective polarizer". The average degree of polarization of this polarized light separation layer was measured and found to be 0.74.

Production Example 4: Production of Polarized Light Separation Layer Including Polarized Light Elimination Layer (Moderate)

A polarized light separation layer having a layer configuration of "polarized light elimination layer (moderate) having a thickness of 3.6 μm/tackiness agent/multi-layer reflective polarizer" was obtained by the same method as that of Production Example 3 except that the applying thickness of the nematic liquid crystal composition was changed. The average degree of polarization of this polarized light separation layer was measured and found to be 0.63.

Production Example 5: Production of Polarized Light Separation Layer Including Polarized Light Elimination Layer (Strong)

A polarized light separation layer having a layer configuration of "polarized light elimination layer (strong) having a thickness of 5.2 μm/tackiness agent/multi-layer reflective polarizer" was obtained by the same method as that of Production Example 3 except that the applying thickness of the nematic liquid crystal composition was changed. The average degree of polarization of this polarized light separation layer was measured and found to be 0.497.

Example 1

A multi-layer reflective polarizer ("DBEF" manufactured by 3M Company) was prepared as a polarized light separation layer. The multi-layer reflective polarizer has a polarized light separation wavelength range containing the entirety of the visible wavelength range, and the average degree of polarization thereof at 400 nm to 680 nm was 0.88. Onto one surface of this multi-layer reflective polarizer, a phase difference film ("Zeonor Film" manufactured by ZEON Corporation, thickness: 55 μm, in-plane retardation: Re(450)=141 nm, Re(550)=140 nm, Re(650)=140 nm) was bonded with a tackiness agent. The bonding operation was performed so that the polarized light transmission axis of the multi-layer reflective polarizer and the slow axis of the phase difference film formed an angle of 45°. After that, the ink composition (W) produced in Production Example 1 was applied onto this phase difference film and dried to form a first display layer.

The same phase difference film as that described above was bonded onto the other surface of the multi-layer reflective polarizer with a tackiness agent. The bonding operation was performed so that the polarized light transmission axis of the multi-layer reflective polarizer and the slow axis of the phase difference film formed an angle of 135°. After that, the ink composition (W) produced in Production Example 1 was applied onto this phase difference film and dried to form a second display layer.

By performing the above-described operations, an optical layered body having a layer configuration of "first display layer/phase difference film as first phase difference layer/tackiness agent/multi-layer reflective polarizer/tackiness agent/phase difference film as second phase difference layer/second display layer" was obtained.

Example 2

The bonding operation of the phase difference film as the first phase difference layer and the multi-layer reflective polarizer was performed so that the polarized light transmission axis of the multi-layer reflective polarizer and the slow axis of the phase difference film formed an angle of 135°. Furthermore, the ink composition (G) produced in Production Example 2 was used instead of the ink composition (W) as the ink composition for forming the first display layer. An optical layered body having a layer configuration of "first display layer/phase difference film as first phase difference layer/tackiness agent/multi-layer reflective polarizer/tackiness agent/phase difference film as second phase difference layer/second display layer" was produced in the same manner as that of Example 1 except for the above-mentioned matters.

Example 3

An optical layered body having a layer configuration of "first display layer/phase difference film as first phase difference layer/tackiness agent/wire grid polarizer/tackiness agent/phase difference film as second phase difference layer/second display layer" was produced in the same manner as that of Example 1 except that a wire grid polarizer ("wire grid polarizer film" manufactured by Edmund Optics Inc.) was used instead of the multi-layer reflective polarizer as the polarized light separation layer. The wire grid polarizer used has a polarized light separation wavelength range containing the entirety of the visible wavelength range, and the average degree of polarization thereof at 400 nm to 680 nm was 0.97.

Example 4

An optical layered body having a layer configuration of "first display layer/phase difference film as first phase difference layer/tackiness agent/polarized light elimination layer (weak)/tackiness agent/multi-layer reflective polarizer/tackiness agent/phase difference film as second phase difference layer/second display layer" was produced in the same manner as that of Example 1 except that the polarized light separation layer including the polarized light elimination layer (weak) produced in Production Example 3 was used instead of the multi-layer reflective polarizer as the polarized light separation layer.

Example 5

An optical layered body having a layer configuration of "first display layer/phase difference film as first phase difference layer/tackiness agent/polarized light elimination layer (moderate)/tackiness agent/multi-layer reflective polarizer/tackiness agent/phase difference film as second phase difference layer/second display layer" was produced in the same manner as that of Example 1 except that the polarized light separation layer including the polarized light elimination layer (moderate) produced in Production Example 4 was used instead of the multi-layer reflective polarizer as the polarized light separation layer.

Comparative Example 1

An optical layered body having a layer configuration of "first display layer/phase difference film as first phase difference layer/tackiness agent/polarized light elimination layer (strong)/tackiness agent/multi-layer reflective polarizer/tackiness agent/phase difference film as second phase difference layer/second display layer" was produced in the same manner as that of Example 1 except that the polarized light separation layer including the polarized light elimination layer (strong) produced in Production Example 5 was used instead of the multi-layer reflective polarizer as the polarized light separation layer.

<Evaluation of Concealability>

The optical layered body produced in each of Examples and Comparative Examples was placed on a stage with the first display layer facing upward, and irradiated with natural light, and first observation was performed. In this first observation, whether the second display layer on the rear side was visually recognized was examined.

Next, the optical layered body was turned over, placed on the stage with the second display layer facing upward, and irradiated with natural light, and second observation was performed. In this second observation, whether the first display layer on the rear side was visually recognized was examined.

The measurement results were determined by the following criteria:

"Visible": The second display layer was clearly visually recognized in the first observation, or the first display layer was clearly visually recognized in the second observation.

"Hardly visible": The second display layer was slightly visually recognized in the first observation, or the first display layer was slightly visually recognized in the second observation.

"Not visible": The second display layer was not visually recognized at all in the first observation, and the first display layer was not visually recognized at all in the second observation.

Ten observers performed the above-mentioned determination. The number of observers who determined each criterion was counted. The determination result "visible" gave 0 point, the determination result "hardly visible" gave 1 point, and the determination result "not visible" gave 2 points. These points were added up to calculate the comprehensive evaluation point in each of Examples and Comparative Examples. The results are shown in Table 1. In Table 1, the meanings of abbreviations are as follows.

cholesteric pigment "W": silver cholesteric pigment (W) that can reflect clockwise circularly polarized light cholesteric pigment "G": green cholesteric pigment (G) that can reflect counterclockwise circularly polarized light rotation direction "R": rotation direction of circularly polarized light that a member can reflect is clockwise rotation direction rotation direction "L": rotation direction of circularly polarized light that a member can reflect is counterclockwise rotation direction mounting angle: angle formed by slow axis of phase difference layer with respect to polarized light transmission axis of reflective linear polarizer MLP: multi-layer reflective polarizer WGP: wire grid polarizer MLP+PEL(w): polarized light separation layer including multi-layer reflective polarizer and polarized light elimination layer (weak)

MLP+PEL(m): polarized light separation layer including multi-layer reflective polarizer and polarized light elimination layer (moderate)

MLP+PEL(s): polarized light separation layer including multi-layer reflective polarizer and polarized light elimination layer (strong)

TABLE 1

<Table 1. Results of Examples and Comparative Examples>

| | Example 1 | Example 2 | Example 3 | Example 4 | Example 5 | Comparative Example 1 |
|---|---|---|---|---|---|---|
| first display layer | | | | | | |
| cholesteric pigment | W | G | W | W | W | W |
| rotation direction | R | L | R | R | R | R |
| first phase difference layer | | | | | | |
| Re (nm) | 140 | 140 | 140 | 140 | 140 | 140 |
| mounting angle (°) | 45 | 135 | 45 | 45 | 45 | 45 |
| polarized light separation layer | | | | | | |
| type | MLP | MLP | WGP | MLP + PEL(w) | MLP + PEL(m) | MLP + PEL(s) |
| average degree of polarization | 0.88 | 0.88 | 0.97 | 0.74 | 0.63 | 0.497 |
| second phase difference layer | | | | | | |
| Re(nm) | 140 | 140 | 140 | 140 | 140 | 140 |
| mounting angle(°) | 135 | 135 | 135 | 135 | 135 | 135 |
| second display layer | | | | | | |
| cholesteric pigment | W | W | W | W | W | W |
| rotation direction | R | R | R | R | R | R |
| Evaluation of concealability | | | | | | |
| visible | 0 observer | 0 observer | 1 observer | 2 observers | 3 observers | 8 observers |
| hardly visible | 2 observers | 2 observers | 3 observers | 2 observers | 4 observers | 2 observers |
| not visible | 8 observers | 8 observers | 6 observers | 6 observers | 3 observers | 0 observer |
| comprehensive evaluation points | 18 | 18 | 15 | 14 | 10 | 2 |

REFERENCE SIGN LIST 100 optical layered body
110 polarized light separation layer
110U first surface
110D second surface
111 reflective linear polarizer
120 first phase difference layer
120U surface
130 first display layer
200 optical layered body
220 second phase difference layer
220D surface
230 second display layer
300 booklet
310 booklet body
311 leaf
312 opening
313 leaf
314 leaf
320 optical layered body
321 polarized light separation layer
322 first display layer
323 second display layer

The invention claimed is:

1. An optical layered body comprising: a second display layer containing a resin having cholesteric regularity, a second phase difference layer, a polarized light separation layer including a reflective linear polarizer; a first phase difference layer, and a first display layer containing a resin having cholesteric regularity, in this order,
an average degree of polarization of the polarized light separation layer at a wavelength of 400 nm to 680 nm being 0.50 or more.

2. The optical layered body according to claim 1, wherein a slow axis of the first phase difference layer and a polarized light transmission axis of the reflective linear polarizer form an angle within a range of 45°±5°.

3. The optical layered body according to claim 1, wherein the first phase difference layer has an in-plane retardation of ¼ wavelength.

4. The optical layered body according to claim 1, wherein the first display layer contains a flake of a resin having cholesteric regularity.

5. The optical layered body according to claim 1, wherein the reflective linear polarizer is a multi-layer reflective polarizer.

6. The optical layered body according to claim 1, wherein the reflective linear polarizer is a wire grid polarizer.

7. An article comprising the optical layered body according to claim 1.

8. The optical layered body according to claim 1, wherein:
a slow axis of the second phase difference layer and a polarized light transmission axis of the reflective linear polarizer form an angle within a range of 45°±5°; and
a slow axis of the first phase difference layer and a slow axis of the second phase difference layer form an angle within a range of 90°±5°.

9. The optical layered body according to claim 1, wherein the second phase difference layer has an in-plane retardation of ¼ wavelength.

10. The optical layered body according to claim 1, wherein the second display layer contains a flake of a resin having cholesteric regularity.

11. A method for determining authenticity of the optical layered body according to claim 1, the method comprising the steps of:
   observing, from the first display layer side, reflected light of light for illuminating the first display layer side of the optical layered body to determine whether the first display layer can be visually recognized; and
   observing, from a side opposite with respect to the first display layer, reflected light of light for illuminating the side of the optical layered body opposite with respect to the first display layer to determine whether the first display layer can be visually recognized.

12. A method for determining authenticity of the optical layered body according to claim 1, the method comprising the steps of:
   observing, from the first display layer side, reflected light of light for illuminating the first display layer side of the optical layered body to determine whether the first display layer and the second display layer can be visually recognized; and
   observing, from a side opposite with respect to the first display layer, reflected light of light for illuminating the side of the optical layered body opposite with respect to the first display layer to determine whether the first display layer and the second display layer can be visually recognized.

* * * * *